United States Patent [19]
Lahti

[11] Patent Number: 4,722,049
[45] Date of Patent: Jan. 26, 1988

[54] APPARATUS FOR OUT-OF-ORDER PROGRAM EXECUTION

[75] Inventor: Archie E. Lahti, Fridley, Minn.

[73] Assignee: Unisys Corporation, Blue Bell, Pa.

[21] Appl. No.: 786,934

[22] Filed: Oct. 11, 1985

[51] Int. Cl.⁴ .............................................. G06F 9/40
[52] U.S. Cl. .................................................. 364/200
[58] Field of Search ... 364/200 MS File, 900 MS File

[56] References Cited
U.S. PATENT DOCUMENTS
4,407,016 9/1983 Bayliss et al. ...................... 364/200

Primary Examiner—Raulfe B. Zache
Attorney, Agent, or Firm—Mark T. Starr

[57] ABSTRACT

A first load vector instruction signal V1 is read from an instruction buffer into an instruction read register. V1 is decoded and routed simultaneously to scalar and vector processor instruction issue registers. V1 is next routed to a vector instruction stage register and from there to a vector load execution pipe. A second load vector instruction signal V2 proceeds in a similar manner until it reaches the vector instruction stage register and is held there because the vector load execution pipe is busy with V1. A store vector instruction signal S1 proceeds in a similar manner until it reaches the vector processor instruction issue register. S1 cannot proceed further as V2 is queued in the vector instruction stage register. A bypass mechanism includes a bypass test register, a bypassed instruction hold register and a bypass control and sequence logic. S1 is transferred into the bypass test register at each clock cycle. The bypass control and sequence logic initiates a bypass sequence. Under the control of the bypass control and sequence logic, V2 is transferred from the vector instruction stage register to the bypassed instruction hold register. S1 is allowed to proceed to the vector instruction stage register and then on to a vector store execution pipe. V2 is returned to the vector instruction stage register completing the bypass sequence.

12 Claims, 28 Drawing Figures

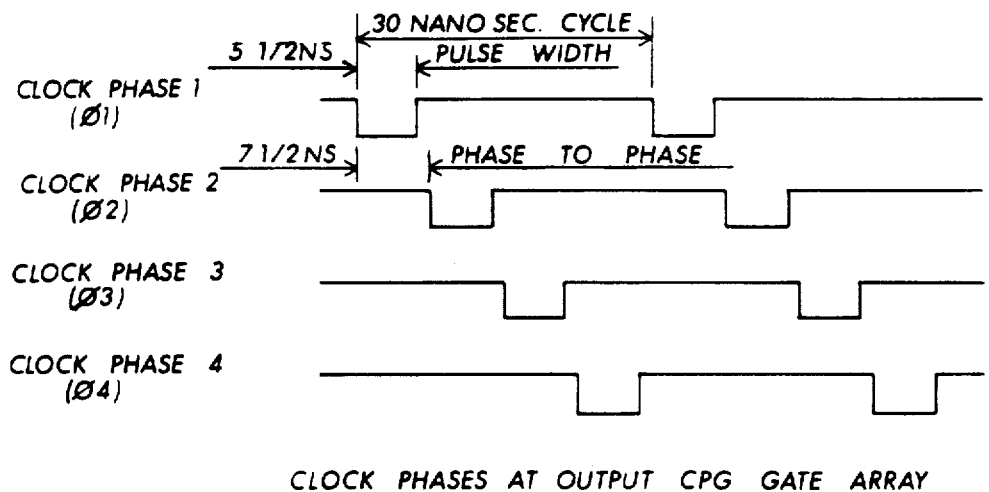
CLOCK PHASES AT OUTPUT CPG GATE ARRAY
FIG. 7
FIG. 6
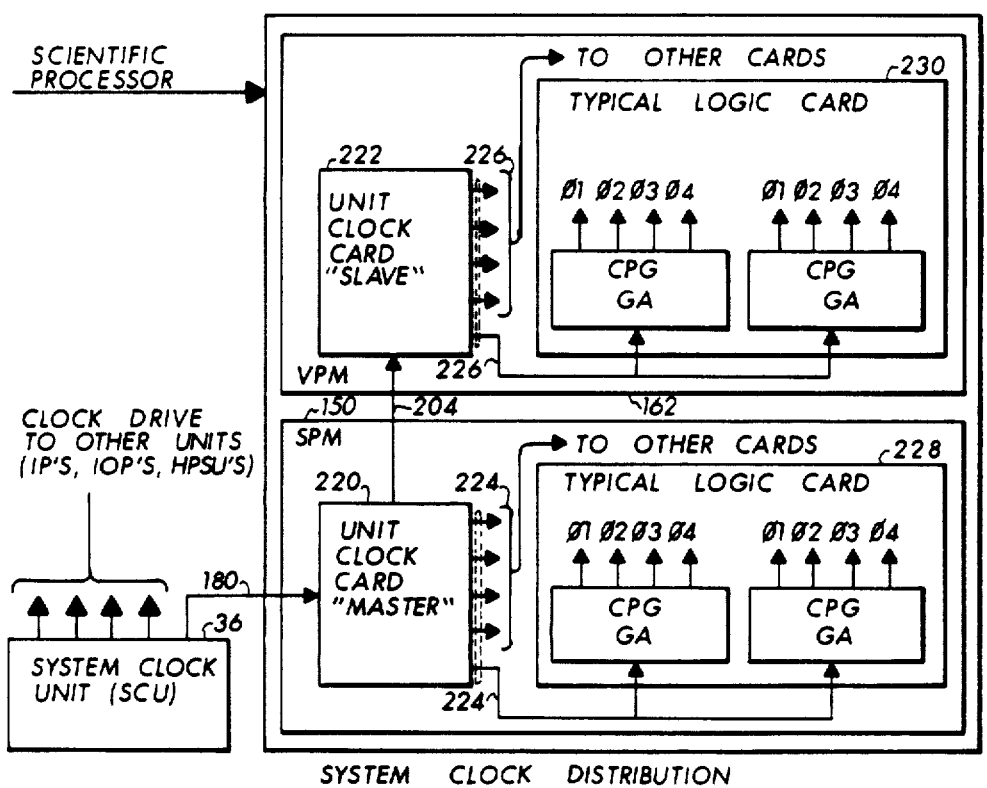
SYSTEM CLOCK DISTRIBUTION

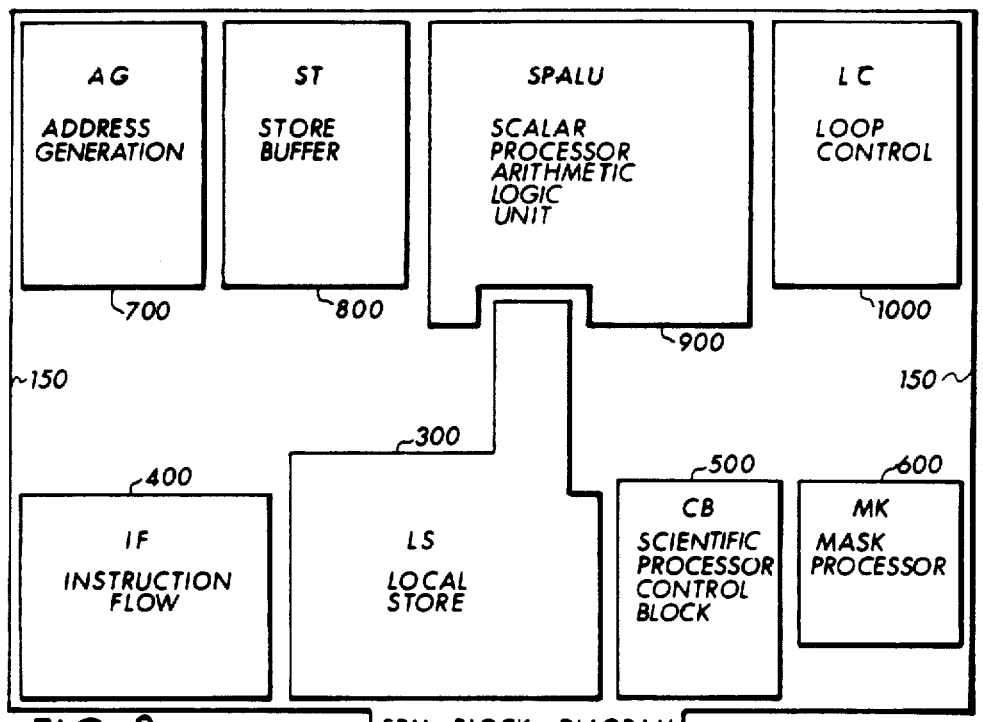
FIG. 8    SPM BLOCK DIAGRAM
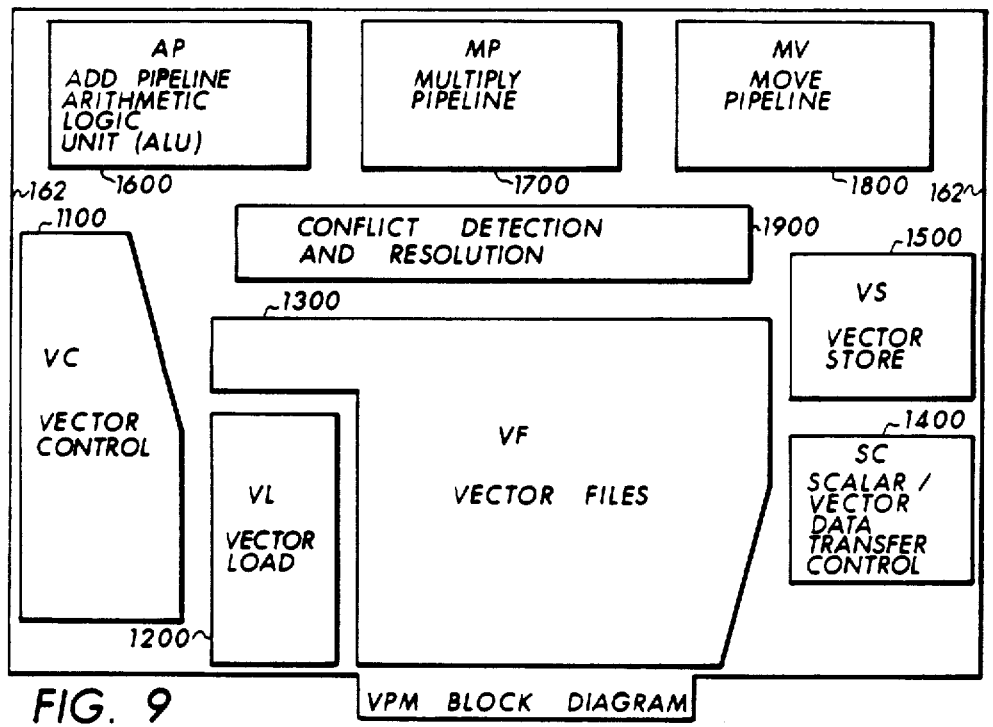
FIG. 9    VPM BLOCK DIAGRAM

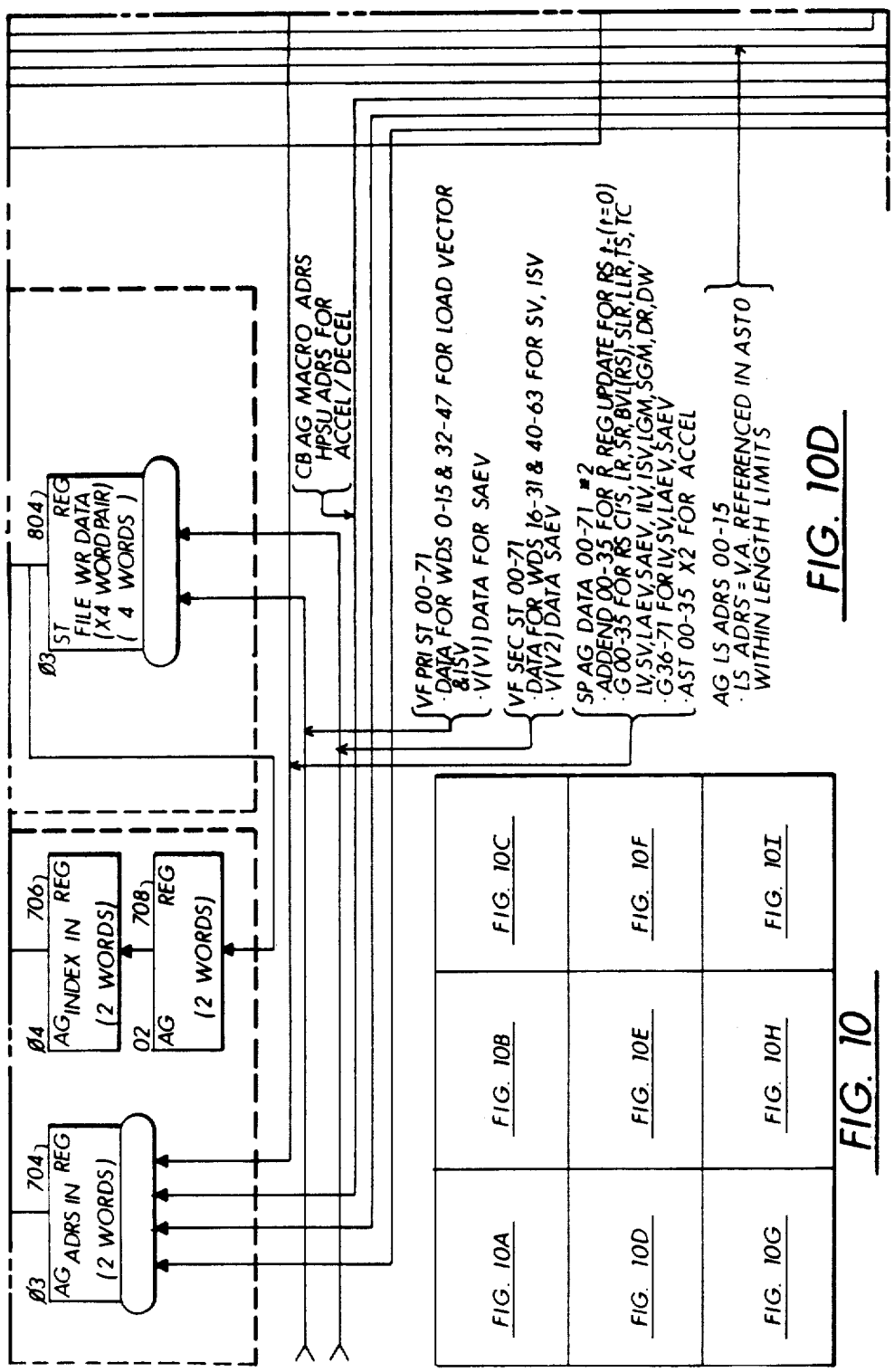

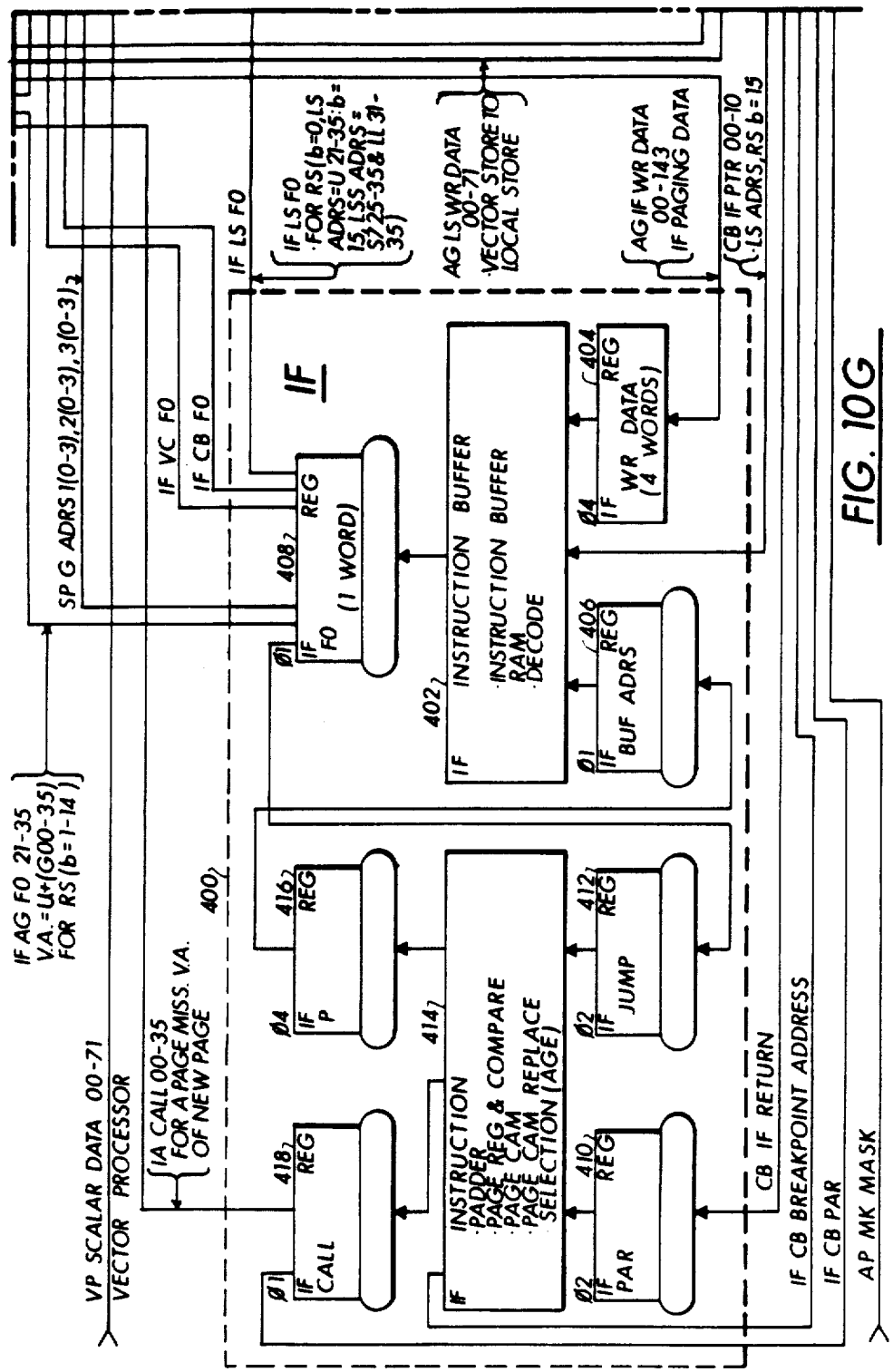

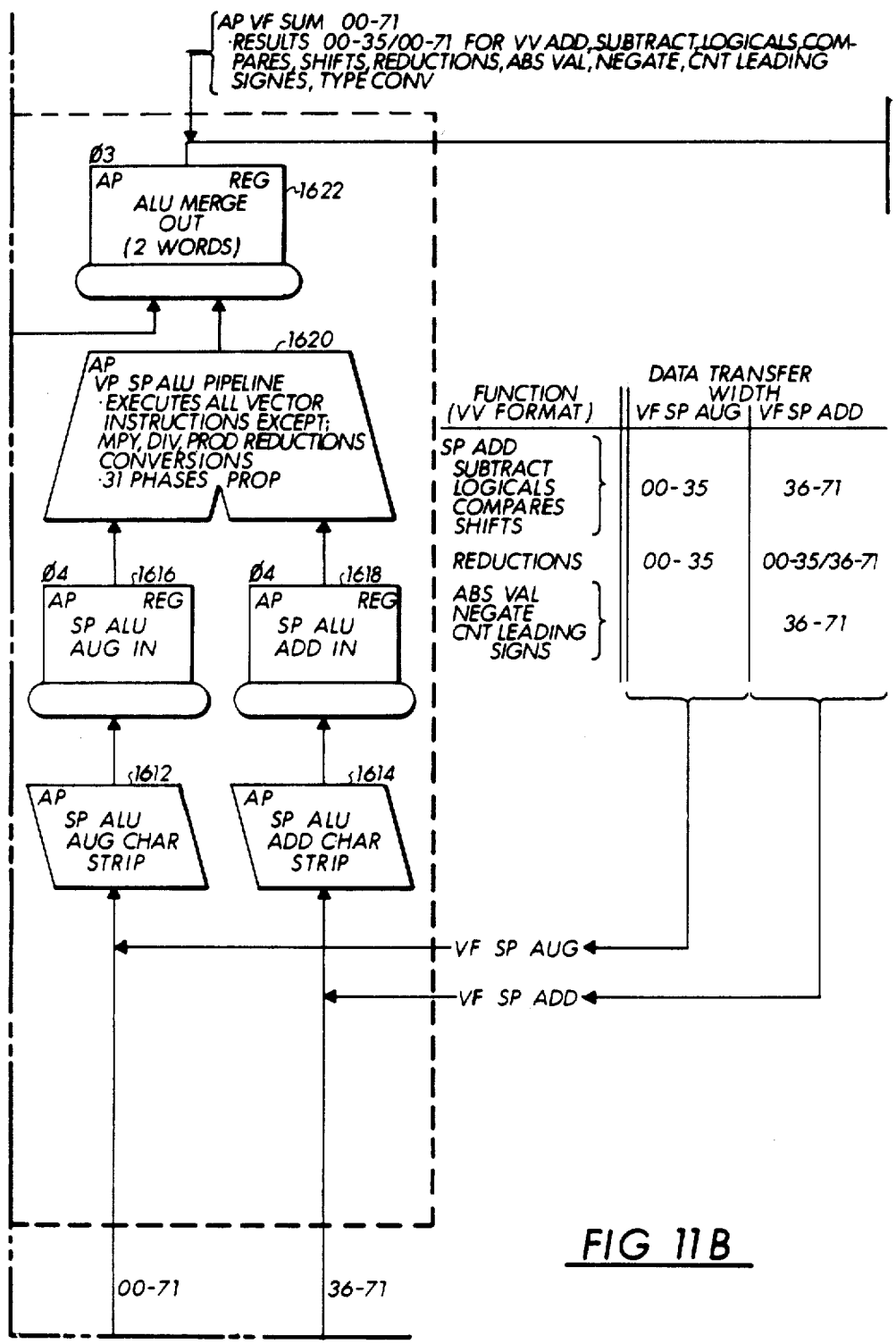

APPARATUS FOR OUT-OF-ORDER PROGRAM EXECUTION

BACKGROUND OF THE INVENTION

1. Field of the Invention

This invention relates generally to electrical computers and data processing systems and more particularly to apparatus for selectively executing program instructions out of the normal sequential order.

2. Background Description

In high performance computer apparatus such as, for example, scientific processors and some general purpose machines, instructions are normally accomplished in the order specified by a program. Normally, these instructions are both executed and finished sequentially in program order. To increase performance and limit delays, some machines have been improved to accomplish the finishing of program instructions out of order so as to overlap with execution instructions. However, the execution instructions are limited to the sequential order called for by the program. A general requirement of such program instruction overlap is that the instructions are completed as though they had been accomplished in the order specified by the program. Program instruction overlap is desirable to increase performance but may involve machine complexity and increase hardware cost. It would be beneficial to further improve program instruction overlap to accomplish both execution and finishing of program instructions out of order without undue complexity and prohibitive cost.

The foregoing illustrates limitations known to exist in present devices. Thus, it is apparent that it would be advantageous to provide an alternative directed to overcoming one or more of the limitations set forth above. Accordingly, a suitable alternative is provided including features more fully disclosed hereinafter.

SUMMARY OF THE INVENTION

In one aspect of the present invention, this is accomplished by providing a high performance computer apparatus with program instruction bypass capabilities for out-of-order program execution. An instruction buffer receives program instructions including a first load vector instruction signal V1, a second load vector instruction signal V2 and a store vector instruction signal S1. An instruction read register receives the instruction signals from the instruction buffer. The instruction signals received by the read register are decoded by an instruction decode logic and are then simultaniously received by scalar and vector processor instruction issue registers. A vector instruction stage register receives instruction signals V1, V2 from the vector processor instruction issue register. A vector load execution pipe receives instruction signal V1 from the vector instruction stage register. Instruction signal V2 is routed from the vector instruction stage register and returns to the vector instruction stage register after being routed through a bypass instruction hold register while being controlled by a bypass control and sequence logic. Instruction signal S1 is routed from the vector processor instruction issue register to the vector instruction stage register via a bypass test register. A vector store execution pipe is connected to receive instruction signal S1 from the vector instruction stage register.

The foregoing and other aspects will become apparent from the following detailed description of the invention when considered in conjunction with the accompanying drawing. It is to be expressly understood, however, that the drawing is not intended as a definition of the invention but is for the purpose of illustration only.

BRIEF DESCRIPTION OF THE DRAWING

In the Drawing:

FIG. 6 is a block diagram of the Clock Distribution system used in the SP;

FIG. 7 is a timing diagram of the Clock Phases of the Clock Distribution System;

FIG. 8 is a simplified pictorial diagram of the major sections of the Scalar Processor Module (SPM) of the SP;

FIG. 9 is a simplified pictorial diagram of the major sections of the Vector Processor Module (VPM) of the SP;

FIG. 10A through FIG. 10I, when arranged as shown in FIG. 10, comprises a logic block diagrams of the Scalar Processor Module (SPM) illustrating in more detail the logical arrangement and functioning of the sections illustrated in FIG. 8;

FIG. 11A through FIG. 11H, when arranged as shown in FIG. 11, comprises a logic block diagram of the Vector Processor Module (VPM) illustrating in more detail the logical arrangement and functioning of the sections illustrated in FIG. 9.

DESCRIPTION OF THE PREFERRED EMBODIMENT

Figure 1:
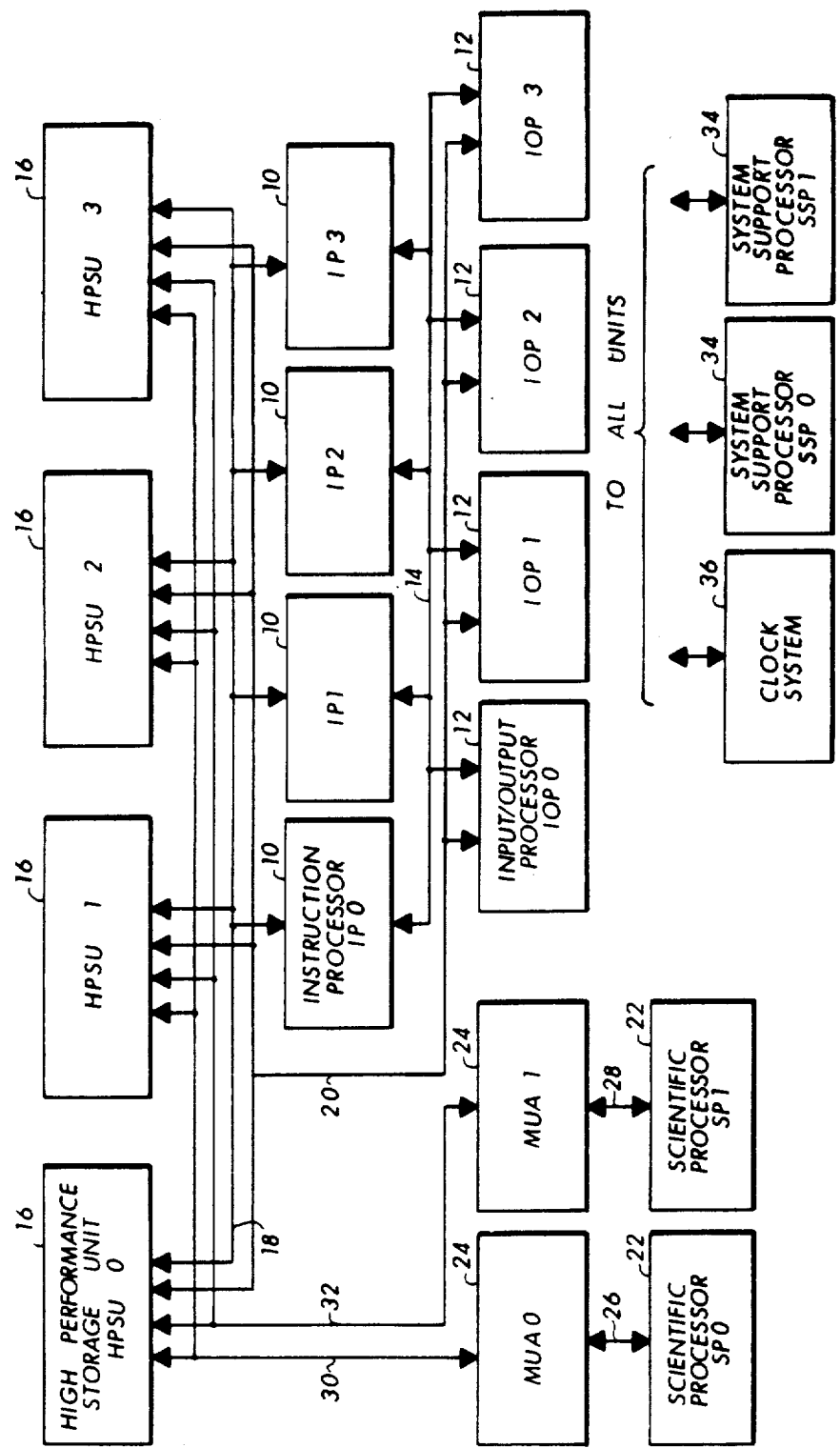
FIG. 1 is a system block diagram of the over-all digital data processing system in which the invention can be utilized.

FIG. 1 is a system block diagram of the over-all digital data processing system in which the invention can be utilized. The over-all system is essentially modular, and provides for parallel processing.

For the configuration illustrated, from one to four Instruction Processors IP0 through IP3, each labelled 10, can be utilized. Each IP can for example be a Type 3054-00 unit available from Sperry Corporation, or such other Instruction Processor available commercially as would be compatible. The IP provides basic mode and extended mode instructions execution, virtual machine capability, and contains two buffer memories (not shown), one an operand buffer, and the other an instruction buffer. Each IP is functional to call instructions from memory, execute the instructions, and in general does data manipulation. The IP also executes instructions to set up input and output data buffers and channel access control.

In conjunction with the IPs, from one to four Input-/Output Processors IOP0 through IOP3, labelled 12, can be utilized. The interconnections between the IPs and the IOPs, collectively labelled 14, are in fact direct connections between each unit, and the interconnection is not used. Each IOP can be a Type 3067-00 unit available from Sperry Corporation, or an equivalent type of processor. The IOPs handle all communications between the IPs, and the memory systems, and the peripheral subsystems (not shown). In this type of configuration, the IPs function as the system Central Processing Units, and the IOPs act as CPUs to handle all of the communications. The IPs and IOPs are commonly referred to as the 1100/90 system.

From one to four High Performance-Storage Units HPSU0 through HPSU3, each labelled 16, can be utilized in the system. Each HPSU is a free-standing unit with eight memory Banks, each Bank containing 524K words. Each HPSU provides four Instruction Processor (IP) ports for providing communication paths to the IPs, both for reading and writing, shown collectively as interconnection paths 18. Again it should be understood that interconnection between each HPSU and each IP is directly cabled, and is not based. Each HPSU also includes four Input/Output Processor (IOP) ports for interconnection with the IOPs. These interconnections are shown collectively as interconnections 20 and are direct cables between each HPSU and each IOP. The IP and the IOP ports are each two-word read and write interfaces, where each word contains 36 data bits and four parity bits. Each HPSU also includes at least one Scientific Processor (SP) port, and in the embodiment shown has two such SP ports. Each SP port has a four-word data interface. The IOP and the IP interfaces operate on a 60 nanosecond clock cycle and the SP interface operates on a 30 nanosecond clock cycle.

Error Correction Code (ECC) is used internally to each HPSU to provide single-bit error correction and double-bit error detection.

In the embodiment illustrated one or two Scientific Processor SP1 and SP2, labelled 22, can be utilized. If a single SP is used with a single HPSU, it may be coupled directly to the SP port of such HPSU. The SP can be for example a Type 3068-00 unit is available from Sperry Corporation. When two or more HPSUs are used with an SP, it is necessary to provide a Multiple Unit Adapter (MUA) for each SP. In this configuration MUA0 and MUA1, each labelled 24, are coupled to SP0 and SP1, respectively, across interface lines 26 and 28. MUA0 is coupled to each HPSU through interconnection paths 30, and MUA1 is coupled to each HPSU through intercommunication path 32.

Each SP functions under direction of one or more of the IPs to perform scientific type calculations in a support mode. In this regard, the IPs can be considered to be the so-called "host" processors and the SPs can be considered to be support processor, all operating through common storage. The host IPs execute the master operating system and function to initiate specific tasks in the SPs. The SPs respond and execute the instructions necessary to accomplish the assigned tasks. The instruction set of the SPs include scalar and vector instructions, as will be described below, and interfaces with the HPSUs without need for large quantities of dedicated storage.

The over-all system maintenance and supervision is accomplished through one or two System Support Processors SSP0 and SSP1, each labelled 34, which are connected to all units of the system. The SSP is available commercially and is utilized in the Sperry Corporation 1100/90 Systems. In general, it is understood that each SSP performs the function of a hardware maintenance panel for the system. The display and setting of information, the activation of most maintenance facilities, selecting modes of operation and the like, is done at the control section of the SSP.

A Clock System 36 is utilized to maintain synchronous operation of the entire system. Clock and synchronizing signals are sent to each IP as well as each HPSU, each IOP, and each SP. The clock interface includes signals and commands from the IP for controlling clock rates, clock mode, cycle count, and other capabilities of the clock.

Intercommunication between units is essentially on a Request and Acknowledge basis, and the in the interfaces will be described in more detail as appropriate.

Figure 2:
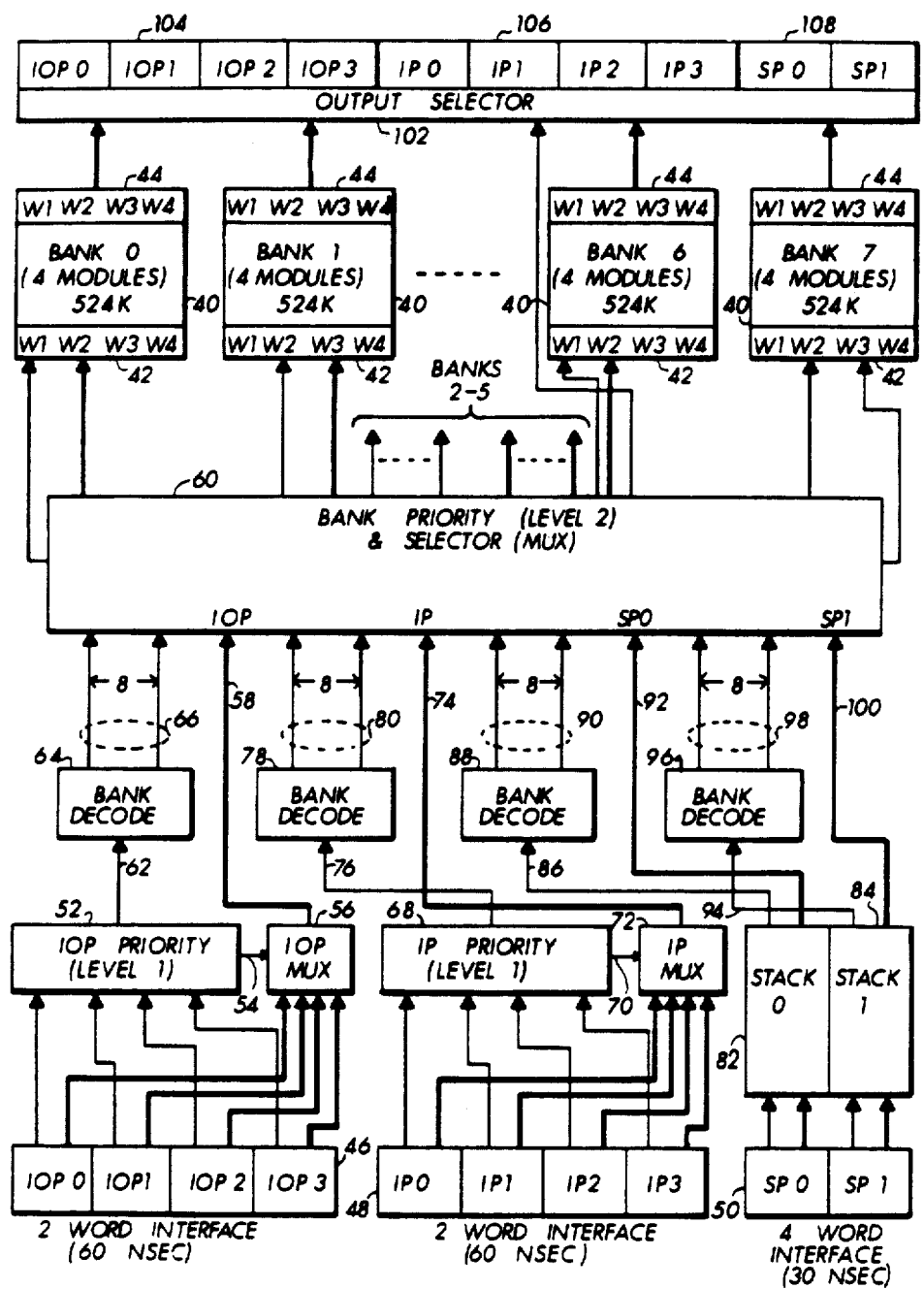
FIG. 2 is a simplified functional blocked diagram of the High Performance Storage Unit (HPSU)

FIG. 2 is a simplified functional blocked diagram of the High Performance Storage Unit (HPSU).

The HPSU is a storage device that is commonly accessible by the IPs, the IOPs, and the SPs via the MUAs. The various devices that can be coupled to the HPSU can have differing interface systems and operational rates.

In the preferred embodiment, the HPSU utilizes eight Banks of storage devices, generally identified as Bank 0 through Bank 7 of which Banks 0, 1, 6, and 7, are illustrated, and each labelled 40 since they are essentially similar. Though not specifically illustrated, each Bank is comprised of four Memory Modules and each Bank has a total capacity of 524 K words. A word in memory is 44-bits, of which 36-bits are data bits and the remaining eight bits are utilized for Error Correction Code (ECC) check bits and parity bits. Each Bank 40 is arranged for receiving four words W1, W2, W3, and W4, labelled 42 for writing, and four such words labelled 44 when read out.

The memory Banks 40 include the addressing circuitry, the storage cells, the timing circuits, and the driver circuits, and can be constructed from commercially available components, it being understood that the accessing rate must accommodate the interface rates with the attached units.

The heavy lines indicate directions of data flow, and the single lines indicate control flow.

At the input, the HPSU has an IOP interface 46 which can accommodate up to four IOP units, at the four IOP ports labelled IOP0 through IOP3. It also has an IP interface 48 which can accommodate up to four IPs at the four IP ports designated IOP0 through IOP3. The IOP port 46 and the IP ports 48 each operate on a two-word interface at a clock rte of 60 nanoseconds.

The HPSU also has an input SP interface 50 which can accommodate two SPs at the two ports labelled SP0 and SP1. The SP ports each function with a four-word simultaneous interface and operate at a clock rate of 30 nanoseconds.

The request and control signals from the IOP ports 46 are passed to the IOP Priority 52, which functions to select the particular IOP to be given priority of access to the memory system The selection is passed on line 54 to the IOP MUX 56 which functions to select the appropriate data and address information to pass on line 58 to the Bank Priority and Selector (MUX) 60. The control signals provided on control path 62 drive the Bank Decode 64 for selecting one-of-eight control lines 66 for providing control signals for making Bank selection.

In a similar manner, the IP ports 48 provide control signals to the IP Priority 68, which provides control signals on control line 70 to the IP MUX 72 for selecting the data and address signals that will be provided on path 74. Similarly, the control signals on line 76 to the Bank Decode 78 results in signals being provided to select one of eight lines 80 for controlling Bank selection.

The two SP ports 50 are each arranged to store requests in Stack 0 labelled 82, and in Stack 1 labelled 84. SP requests and data are temporarily held in Stack 0 and Stack 1 awaiting availability of the memory system. In essence, Stack 0 and Stack 1 are each a first-in-first-out (FIFO) circulating buffer The request information feeds out of Stack 0 on line 86 to the Bank Decode 88 which provides a one-of-eight selection and data passes on line 92 to the Bank Priority Selector 60. Similarly, request information passes on line 94 to the Bank Decode 96 for making selections on lines 98, while the data passes on line 100.

The Bank priority and Selector functions to select between the IOP, IP, and the two SP requests presented to it for accessing memory. It also functions to control the Output Selector 102 when reading is to take place. The HPSU has an IOP output 104 capable of handling four IOP ports IOP0 through IOP3. It also has an IP output 106 capable of handling four IP ports labelled IP0 through IP3. Finally, it has an SP output 108 capable of handling two SP output ports (from the HPSU) labelled SP0 and SP1. Data rates and timing at the output ports 104, 106, and 108 are similar to those for the input ports previously described.

Figure 3:
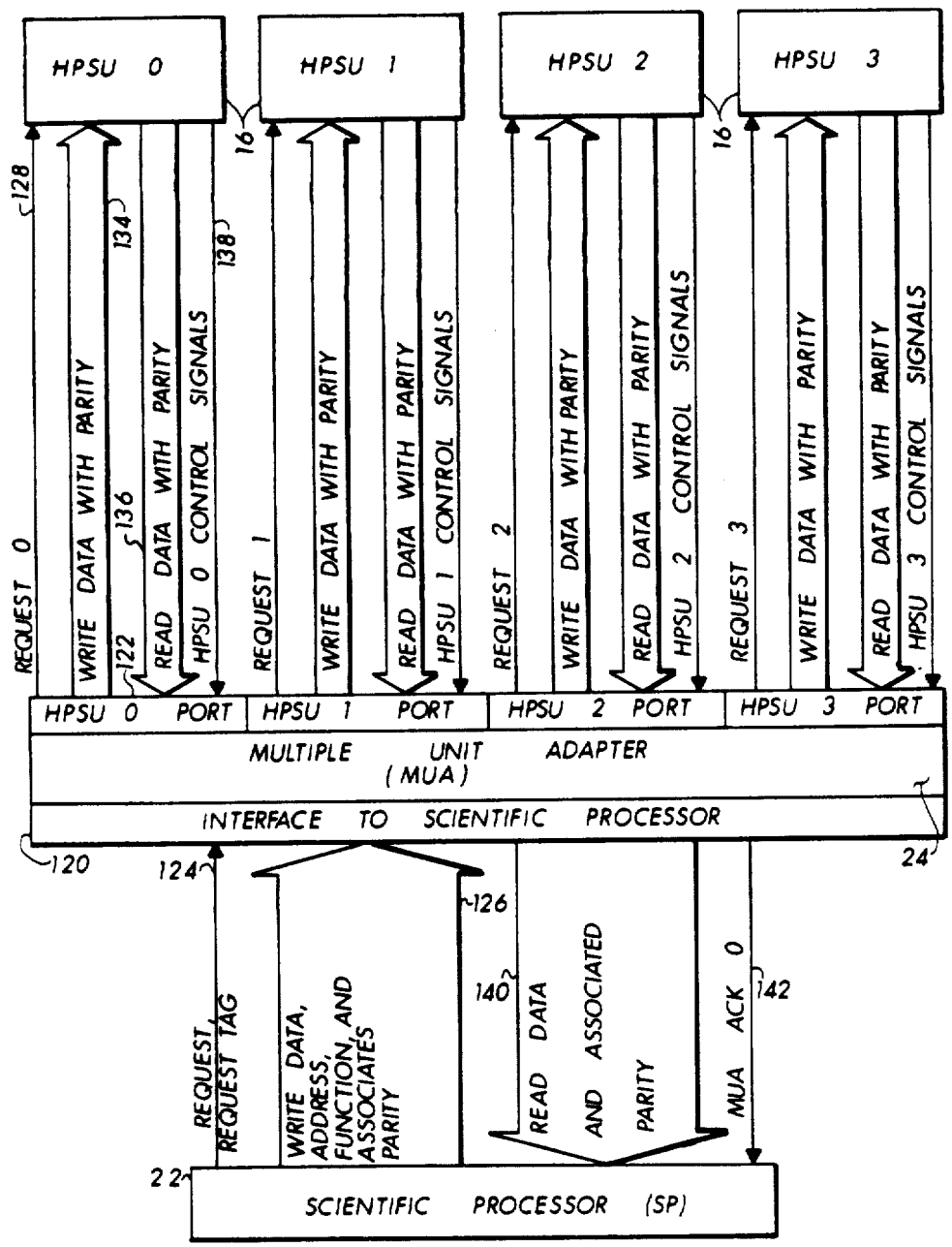
FIG. 3 is a simplified block diagram of the Multiple Unit Adapter (MUA) for providing selective interconnection of a Scientific Processor to one of up to four High Performance Storage Units.

FIG. 3 is a simplified blocked diagram of the Multiple Unit Adapter (MUA) for providing selective interconnection of a Scientific Processor 22 to one of up to four High Performance Storage Units 16.

The MUA 24 has an Interface 120 to Scientific Processor (SP) 22 and up to four HPSU ports 122, each adapted for interconnection to an associated HPSUs 16.

A Scientific Processor (SP) 22 issues Request signals on control path 124 to the MUA. For a write operation, the write data, address, function, and associated parity is provided via cable 126. The MUA can accumulate up to eight requests from the SP without acknowledgement, and the requests and the associated data are stored in a first-in-first-out (FIFO) stack (not shown). This accumulation can be considered as pipelined or queued requests.

For purposes of example, if it is assumed that the SP has designated HPSUO, and the request is determined by the MUA to be the next request to be processed, a Request 0 will be provided on control path 128 to HPSUO. Recaling that this will be only one of several requests that can be provided to HPSUO, it will be honored when its priority is selected. If the function is write, the write data with parity will be provided on cable 134. If the function is to read, the read data with parity will be passed from HPSUO on cable 136 to the MUA. Upon completion of the requested function, the HPUSO control signals will pass via control path 138 to the MUA. When the MUA establishes that the current request is a read, the read data and associated parity will pass on cable 140 to the SP. As each request is passed on to the selected HPSU, an MUA Acknowledge 0 (ACK 0) signal will be passed on control path 142 to the SP, thereby indicating that the stack has room for one more request.

When the MUA has passed eight requests to an HPSU without acknowledgement the MUA ceases requesting until an Acknowledge 1 (ACK 1) control signal is received in control cable 138.

The control and data path lines for HPSU1, HPSU2, and HPSU3, would function in a similar manner. When the SP requests access to a different HPSU, all outstanding requests to the first HPSU must be serviced prior to the MUA processing requests to a different HPSU.

All data and control signals from the SP are passed on to the HPSU, with the exception of a few special control signals, and all data and control signals from the HPSU are passed on to the SP. The SP data word is four 36-bit words wide. Along with the data field, an address field of 22-bits and a function field of 6-bits are sent with the request. Odd parity is provided for every 9-bits of data, making the SP data word transmission a total of 160-bits, the address field a total of 25-bits, and the function code field a total of 7-bits.

Figure 4:
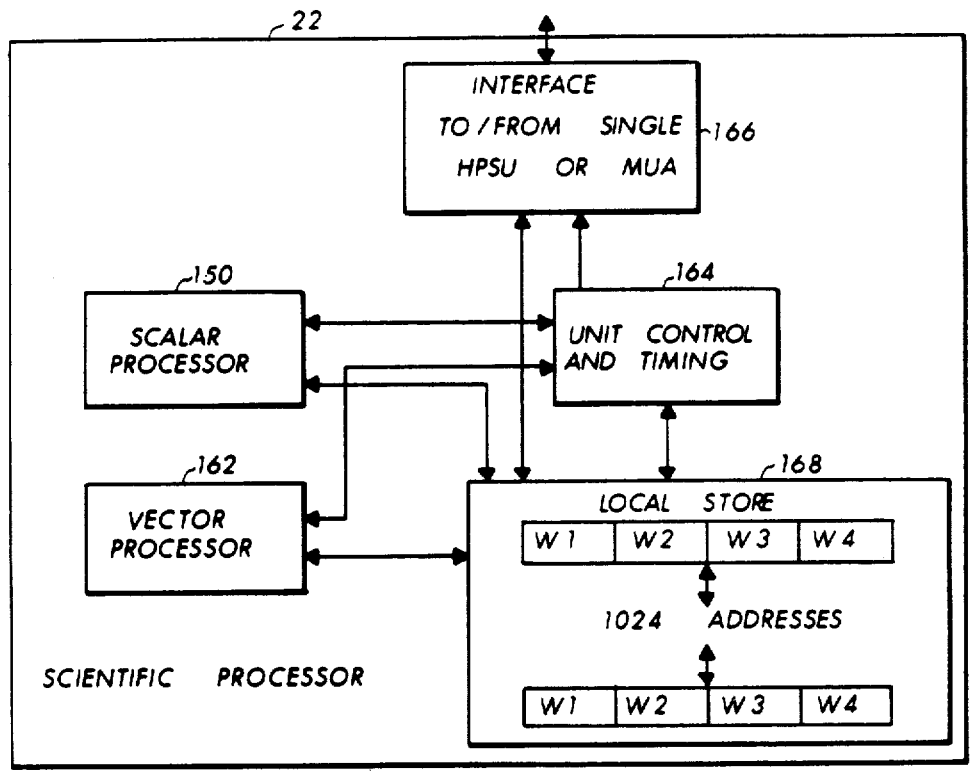
FIG. 4 is a simplified block diagram of the Scientific Processor (SP)

FIG. 4 is a simplified blocked diagram of the Scientific Processor (SP).

Basically, the SP 22 is a subsystem defined as an attached processor optimized for the high speed execution of floating-point vector arithmetic operations. It is intended to execute user code only and is not intended to run an executive program. It does not require a control program nor does it have any priviledged modes of operation. The SP includes distinct modules, the Scalar Processor Module (SPM) 150, the Vector Processor Module (VPM) 162, the Unit Control Timing 164, the Interface 166, and the Local Store 168.

The Vector Processor Module 162 performs vector calculations. The Scalar Processor Module 150 performs scalar operations, and also has the over-all control function, including instruction fetch and issue. Generally speaking, the Scalar and Vector processor instructions require both modules to execute.

The Local Store 168 in the preferred embodiment comprises a high speed random-access memory (RAM) 4,096 words. The arrangement is such that four words W1 through W4 are accessed simultaneously, yielding an addressable range of 1,024 addresses. The Local Store 168 is used primarily for the storage of frequently used scalar variables, and it should be noted as distinquished from the relatively large dedicated memory sections in prior art support processors, the minimal storage being rendered sufficient through the coupling to the plurality of HPSUs.

The general system environment and background described with regard to FIG. 1 through FIG. 4 is set forth to indicate the complexity of the data processing system in which the subject invention may be utilized.

The Scientific Processor (SP) 22 is part of a tightly coupled multiprocessor system. The primary purpose of the SP is the high speed execution of vector floating-point arithmetic. As described with reference to FIG. 1 two new units have been designed to allow operation of SP(s) in the 1100/90 multiprocessor system. They are the High Performance Storage Unit HPSU(s) 16, and the Multiple Unit Adapter MUA(s) 24.

Each SP only runs usser programs that are set up in an HPSU by one of the IPs. Programs and portions of programs set up for execution on an SP are called activities.

In a minimum multiprocessor system configuration utilizing an SP, the HPSU is central to the system. The SP, the IP, and the IOP all interface to the HPSU. The SP has one special port that allows requests each clock cycle, while other ports only accept requests on a two clock cycle basis. Multiple requests for the same module address range within the HPSU are honored on a certain priority basis and in that case, some of the requesters must wait their turn.

The System Clock Unit (Clock System 36) provides logic clock signals to the HPSU, the SP, the IP and the IOP. Each System Support Processor (SSP) 34 has its own clock source (not shown). The SSP is directly connected to the HPSU, the IOP the IP and to the SP. It is also indirectly connected to the System Clock Unit 36 and to the Instruction Processor Cooling Units (not shown).

Figure 5:
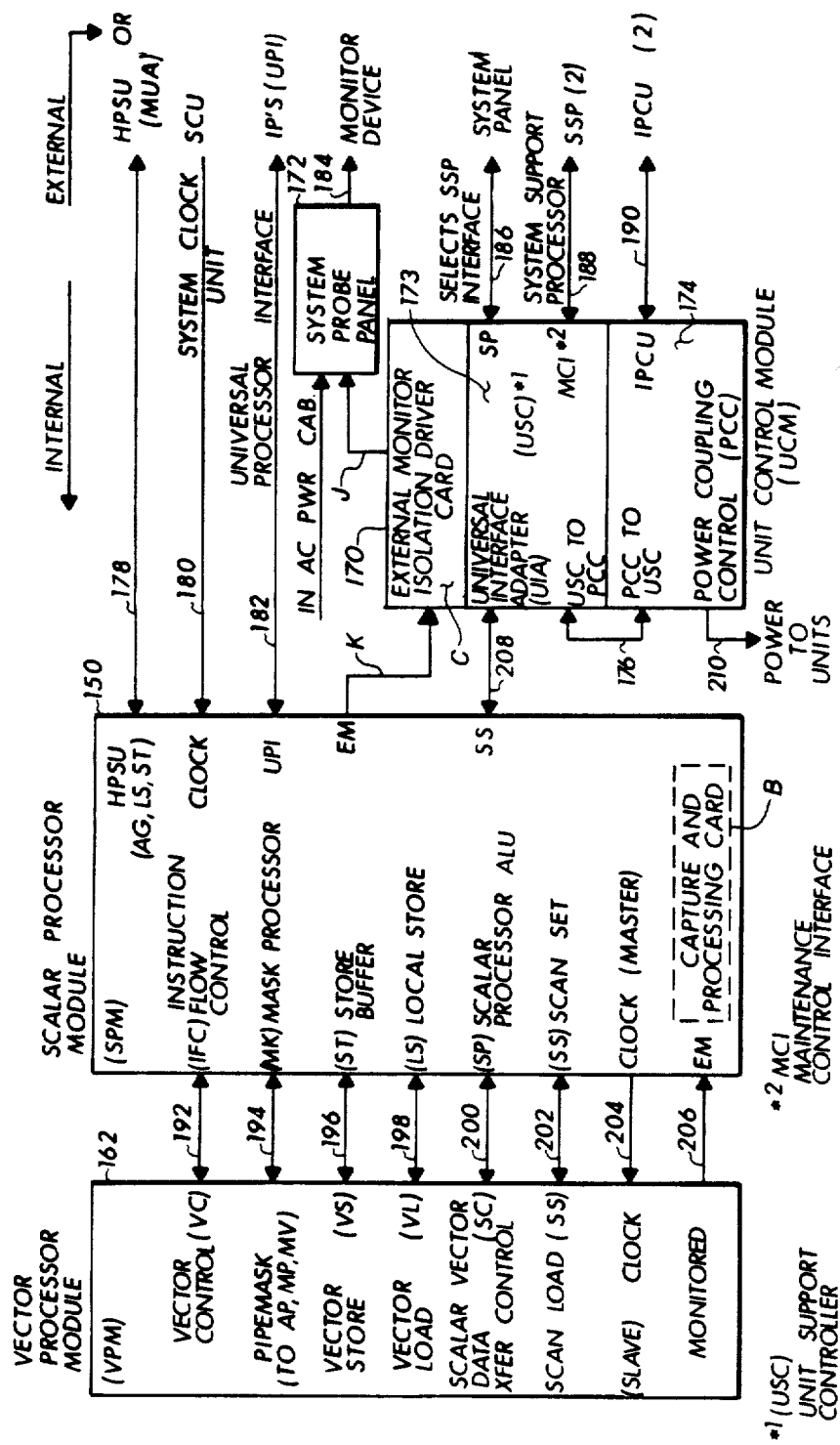
FIG. 5 is a block diagram of the Scientific Processor (SP) Internal and External Interfaces.

FIG. 5 is a block diagram of the Scientific Processor (SP) internal and external interfaces. In the Scientific Processor, which is designated as a Type 3068-0 unit available from Sperry Corporation, there are four internal units or modules, namely the Vector Processor Module (VPM) 162, the Scalar Processor Module (SPM) 150, the Unit Control Module (UCM) 170, and the System Probe Panel 172. The Unit Control Module 170 is further partitioned into two logical entities, the Unit Support Controller (USC) 173 and the Power Coupling Controller (PCC) 174. The USC-to-PCC 176 is an internal interface.

The interfaces are shown as lines, but it should be understood that this is illustrative only, and that physically there may be multiple conductors and circuits utilized. The external interfaces, are the interfaces to other units within the central complex, and are listed down the right hand side of the FIG. 5. The read/write data interface via line 178 to the HPSU or MUA interfaces with the SPM 150. The System Clock Unit (SCU) interfaces via lines 180 with the SPM 150. The Universal Processor Interface (UPI) and the Instruction Processor(s) is interfaced via line 182. The interface at the System Probe Panel 172, to the Monitor Device is via line 184. The input from the System Panel selects the SSP interfaces and interfaces with the Unit Support Controller 173 of the Unit Control Module 170 via line 186. One of the things that this interface does is to select the next interface. There are two interfaces via line 188 to two different System Support Processor 34 which interface with the Maintenance Control Interface (MCI) of the Unit Support Controller 173. The last external interface 190 is from the Power and Cooling Controller 174 to the Instruction Processor Cooling Units (not shown). It selects one of the two cooling units and monitors environmental condition.

The internal interfaces are the interfaces going between the VPM 162 and the SPM 150. The instruction interface 192 is from the Instruction Flow Control (IFC) logic section of the SPM to the Vector Control (VC) section of the VPM. The mask interface 194 is from the Mask Processor (MK) of the SPM to the Add Pipe (AP), the Multiply Pipe (MP), and the Move Pipe (MV) in the VPM. These will be described in detail below. The Vector Store (VS) interface 196 provides information stored in the Vector Files to the Store Buffer (ST). It also provides information from main storage, or HPSU or Local Store. The Vector Load (VL) interface 198 transfers data from the Local Store (LS) section to the Vector Load (VL), from where it is transferred into the Vector Files. The source of the data in this case is from the HPSU or from Local Store. The Scalar Vector Data Transfer (SC) interface 200 transfers data from the SPM to the VPM. It also writes Scalar instruction into the Vector Files or broadcasts G operands. Further it transfers data in the opposite direction from the VPM to the SPM. This data could be elements from Vector Files or results or reduction instructions. The Scan Set (SS) interface 202 couples the master Scan Set card in the SPM to the slave Scan Set card in the VPM. The clock interface, 204 is from the master clock card in the SPM to the slave clock card in the VPM. The last interface shown is the External Monitor (EM) interface 206. It involves a collection of key logic signals in the VPM. These signals are routed to the SPM and ultimately they go out of the external monitor interface of the System Probe Panel 172.

There is another internal interface 208 from the SPM to the Unit Support Controller 173. This is the universal interface adapter interface from the Unit Support Controller and connects to the Scan Set card of the SPM. An interface 210 is provided between the Unit Control Module 170 and the power and cooling units (not shown).

FIG. 6 is a block diagram of the Clock Distribution System. The System Clock Unit (SCU) 36 provides multiple drives, with a separate drive for each IP, IOP and HPSU in the system.

The interface 180 from the System Clock Unit SCU comes into the Master unit clock card 220 in the Scalar Processor Module (SPM) 150. From there, clock signals are sent to the Slave Unit Clock Card 222 in the Vector Processor Module (VPM) 162. The unit clock cards 220 and 222 serve their respective modules. The lines 224 and 226 emanating from the unit clock cards represent the drive to remaining logic cards within the associated module. Typical logic cards 228 and 230 in each module receive the clock drive from the System Clock Unit, and utilizes two Clock Pulse Generator (CPG) Gate Arrays (GA) on each card to derive the four phase clock signals identified as phases 1, 2, 3, and 4 (01, 02, 03, 04) for distribution on that logic card. In other words, each logic card has its associated CPG circuits.

FIG. 7 is a timing diagram of the Clock Phases. The clock phases illustrated occur at the output of the two Clock Pulse Generators on each logic card. The low portion of each clock pulse is the active level. The time low is the period of the clock pulse that is considered its active time. Four clock pulse phases are generated. The times shown are common to all four phases. The clock cycle is 30 nanoseconds from start of one clock pulse in a phase to the start of the next occurring pulse in that phase. The clock pulses are nominally 5½ nanoseconds in duration. The time duration from the beginning of a clock signal in one clock phase to the beginning of a clock signal in the next subsequent clock phase is nominally 7½ nanoseconds.

While not illustrated, some of the features of the high performance technology utilized to construct the SP will be described. Emitter coupled subnanosecond circuits including gate arrays and Small Scale Integrated (SSI) circuits, known in the industry as the 100K family are used. The gate array circuits have 168 logic gates, 48 logic pins and power dissapation of up to 5 watts. The SSI packages, or chips as they are called, have 21 logic pins and power dissapation of up to a one-fourth of a watt. Most of the IP gate arrays plus 13 additional types that were designed specifically for this SP are used. The printed circuit cards have space for a maximum of 227 SSI circuit packages. Gate arrays require two SSI locations. The printed circuit cards are never fully populated with gate array circuit packages or chips, since a certain number of spare circuit locations for possible logic changes were provided. A pair of card pins for logic changes, check out and modifications are also reserved. In some instances power distribution pins on a card are the limiting factor for the necessary interconnections. The printed circuit cards are 11.3 inches wide by 10.8 inches deep, with logic, power, and ground connectors on three edges. Connectors on the rear edges of the cards plug into a back panel of the module through use of a conventional conector. The two side edges of the cards connect to the side panel to the module with Zero Insertion Force (ZIF) connectors. The cards are paired together and have two connectors for logic signals between the cards of the pair. These circuit packages are water cooled by a cold plate between the cards of the pair. Two cards of a cold plate are molded together into a subassembly part for insertion into the card module. Each module has room for a maximum of 52 cards or 26 card pairs. The SPM has 48 cards and the VPM has 52 cards. Ribbon cable and coaxial cable are used for logic interconnect between the SPM and VPM.

FIG. 8 is a block diagram of major sections of the Scalar processor Module (SPM) of the SP. FIG. 9 is a block diagram of the major sections of the Vector Processor Module (VPM) of the SP. These two drawings taken together illustrate the machine organization at the major section level. First, as to the section block diagrams in general, there are a total of sixteen major logic sections with eight sections in each of the SPM and the VPM. Several additional auxiliary sections are present, such as the Scan Set and the external monitor however, these will be referred to only briefly since they are not necessary for a complete understanding of the invention. Each section has a character identifier. This identifier is also used as a prefix for exchange for all logic signals originating in that section. In the SPM (FIG. 8), break-out to the eight logic sections is on a functional basis. These sections provide architectually, required functions. In the VPM (FIG. 9) the sections are designated to accommodate explanation of the parallel pipelined operations of the vector processing sections.

The sixteen logic sections mentioned for FIG. 8 and FIG. 9 indicate their relative positions on the later detailed block diagrams. Referring now to the SPM block diagram of FIG. 8, there is illustrated the Instruction Flow Control (IF) section 400; the Local Store (LS) section 300; the Control Block (CB) section 500; the Mask Processor (MK) section 600; the Address Generation (AG) section 700; the Store Buffer (ST) section 800; the Scalar Processor Arithmetic Logic Unit (SPALU) 900; and the Loop Control (LC) section 1000.

The VPM sections are shown in FIG. 9, and again the relative positions of the various sections are indicated as they will be related to more detailed block diagrams. These major sections include the Vector Control (VC) section 1100; the Vector Load (VL) section 1200; the Vector File (VF) section 1300; the Scalar Vector Data Transfer Control (SC) section 1400; the Vector Store (VS) section 1500; the Add Pipeline (AP) section 1600, which includes an Arithmetic Logic Unit (ALU); the Multiply Pipeline (MP) section 1700; and the Move Pipeline (MV) section 1800. A special control section Conflict Detection and Resolution 1900 is utilized to resolve conflicts between the various pipelined sections.

Figure 10A:
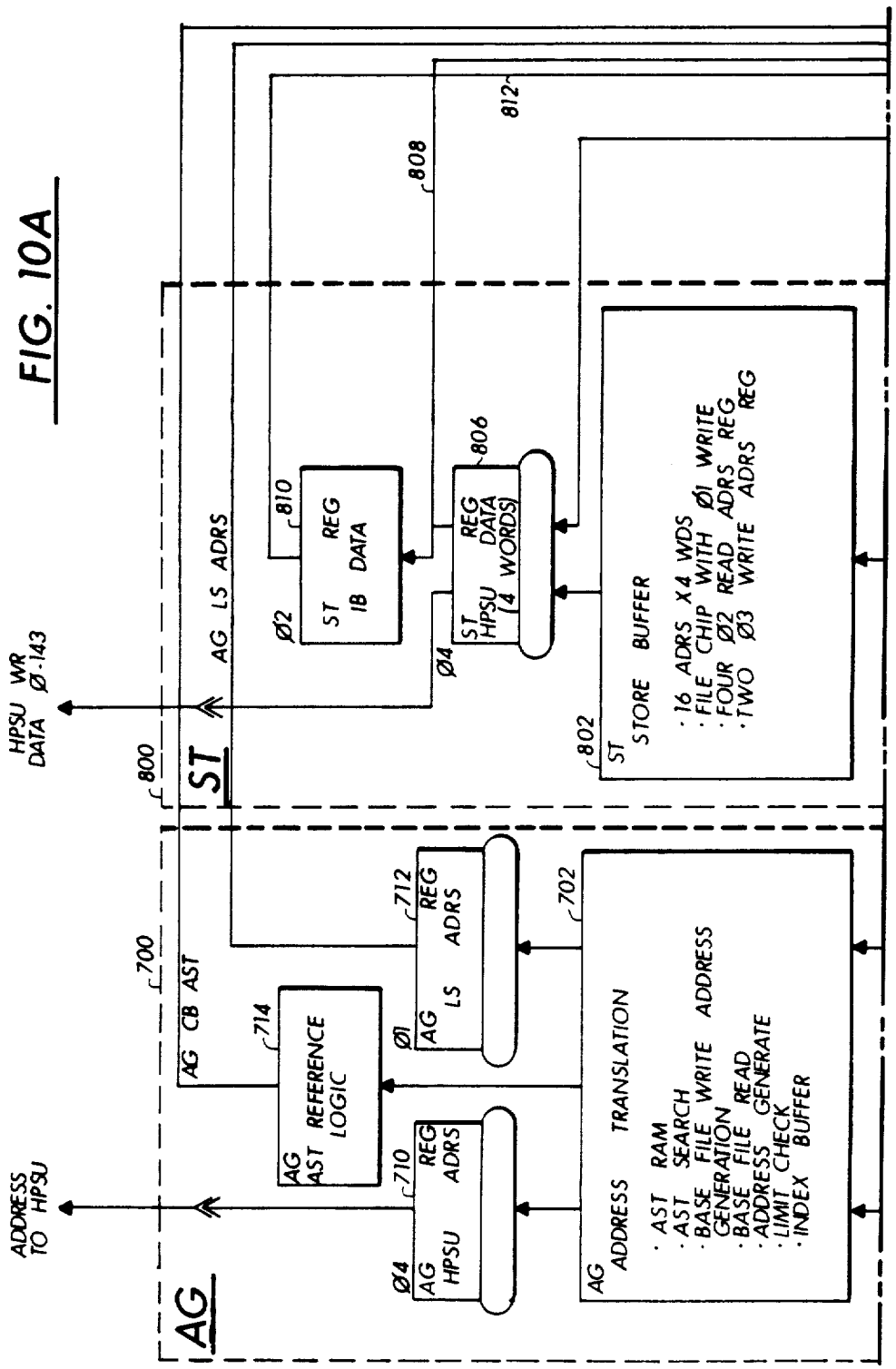
Figure 10B:
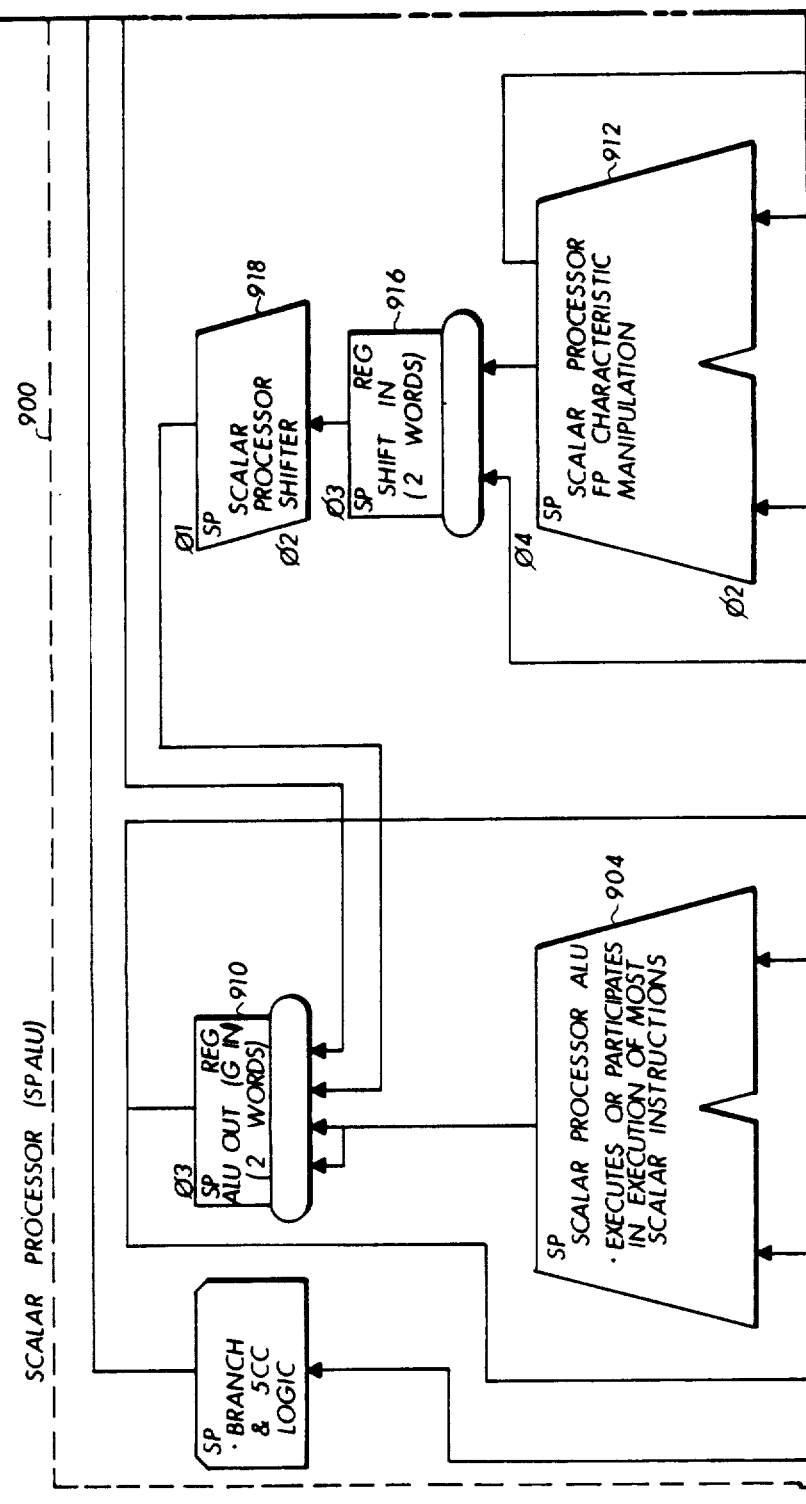
Figure 10C:
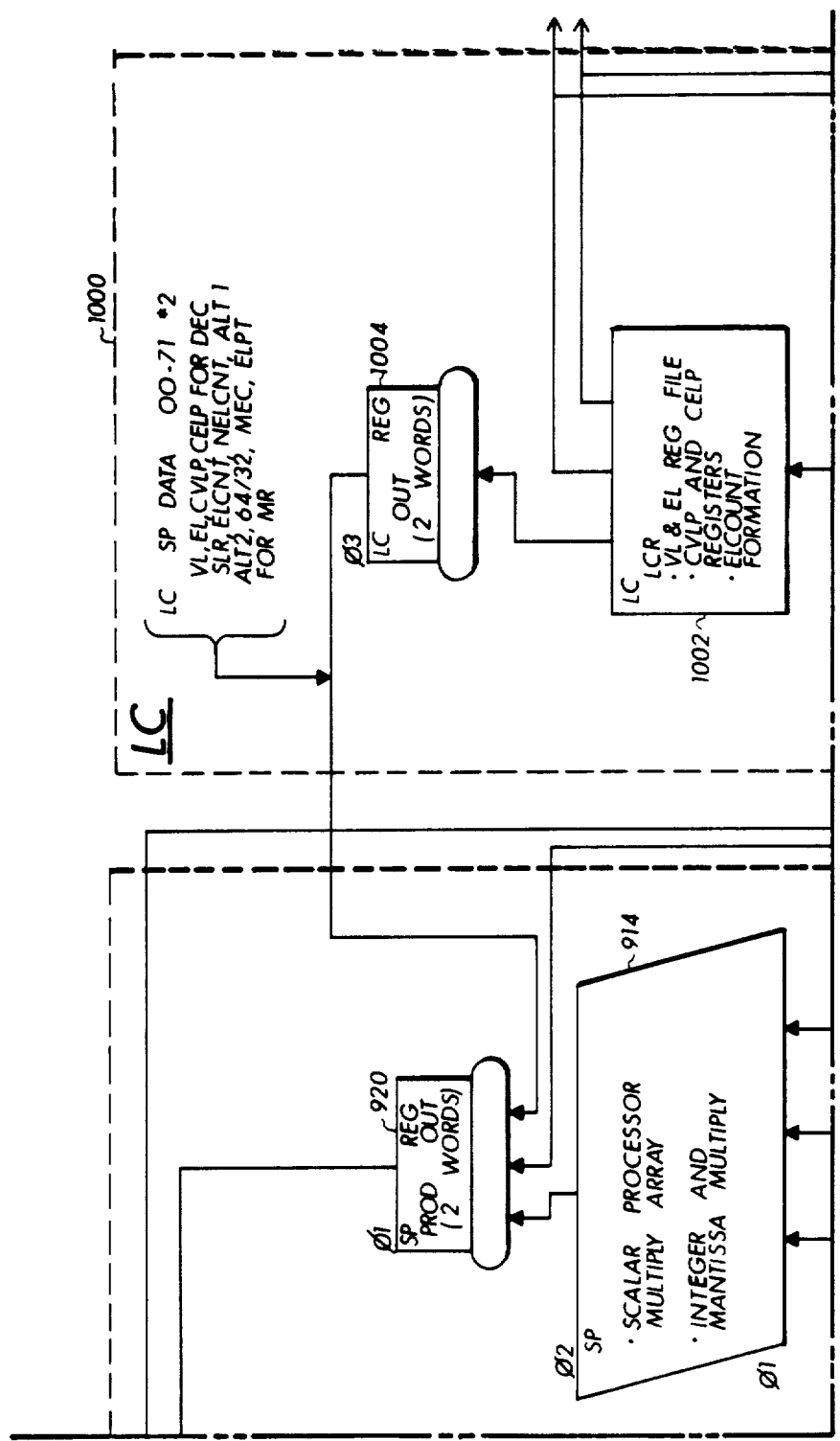
Figure 10:
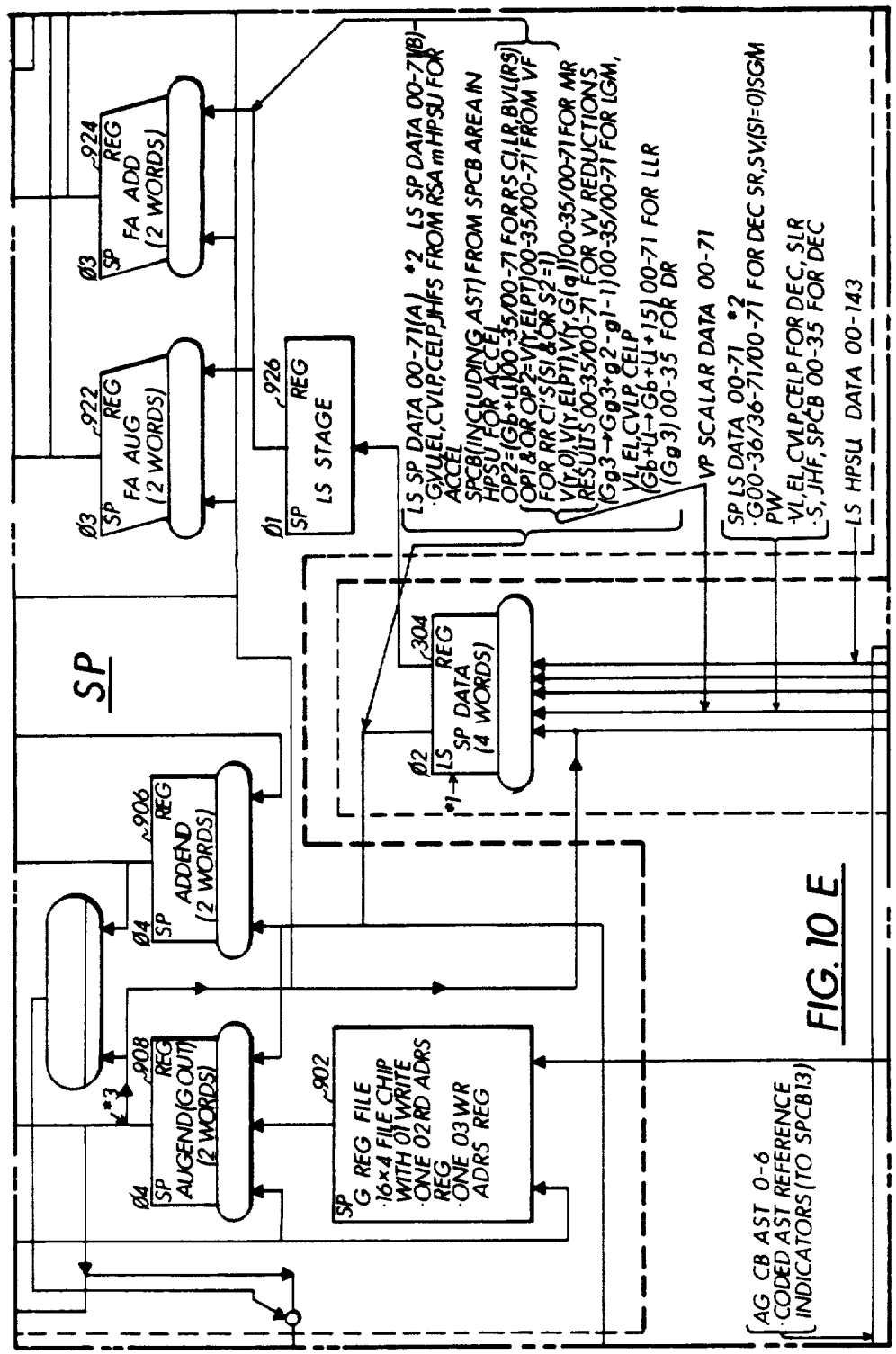
FIG. 10 is a logic block diagram of the Scalar Processor Module (SPM) illustrating in more detail the logical arrangement and functioning of the sections illustrated in FIG. 8.
Figure 10F:
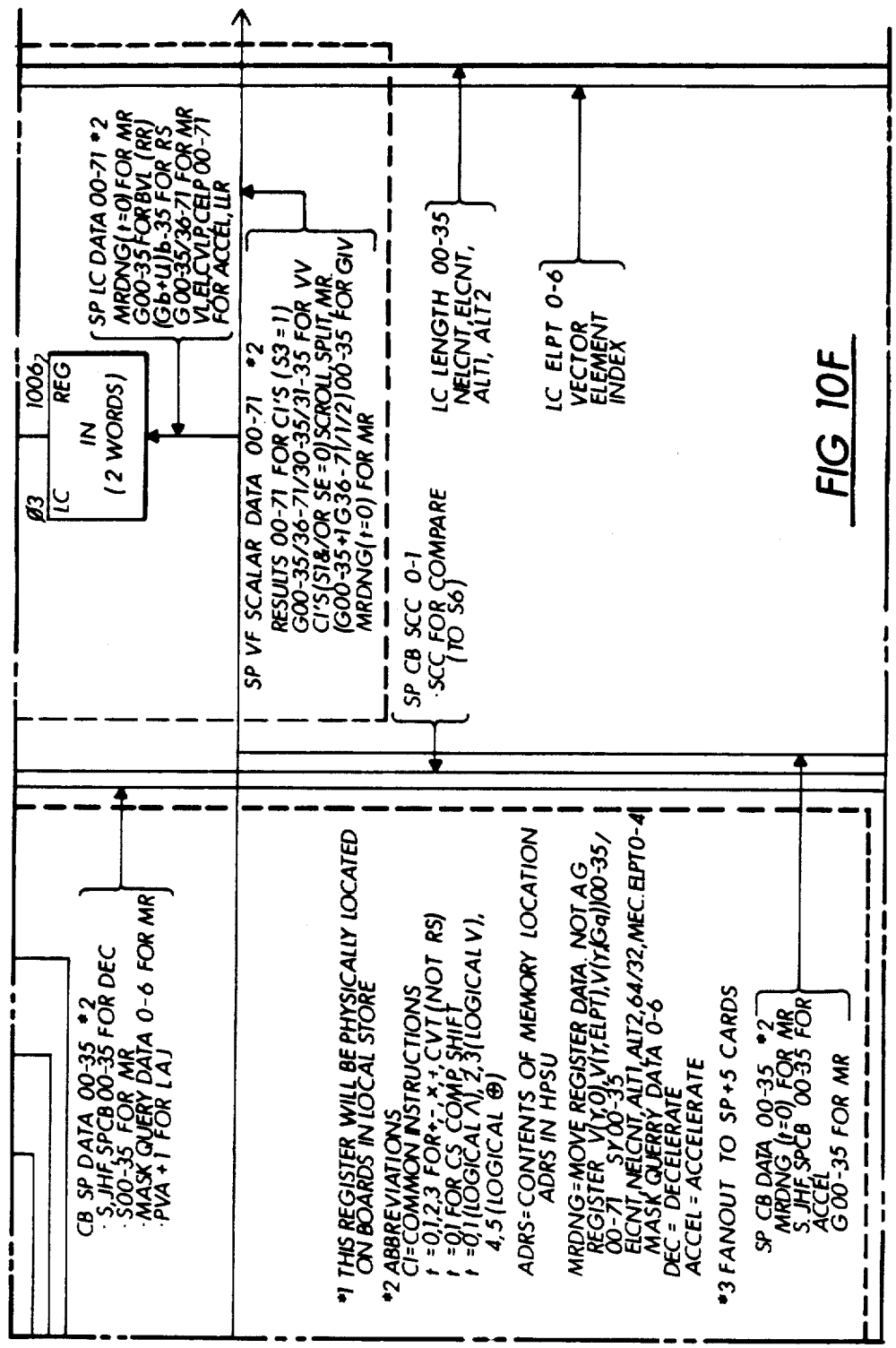
Figure 10H:
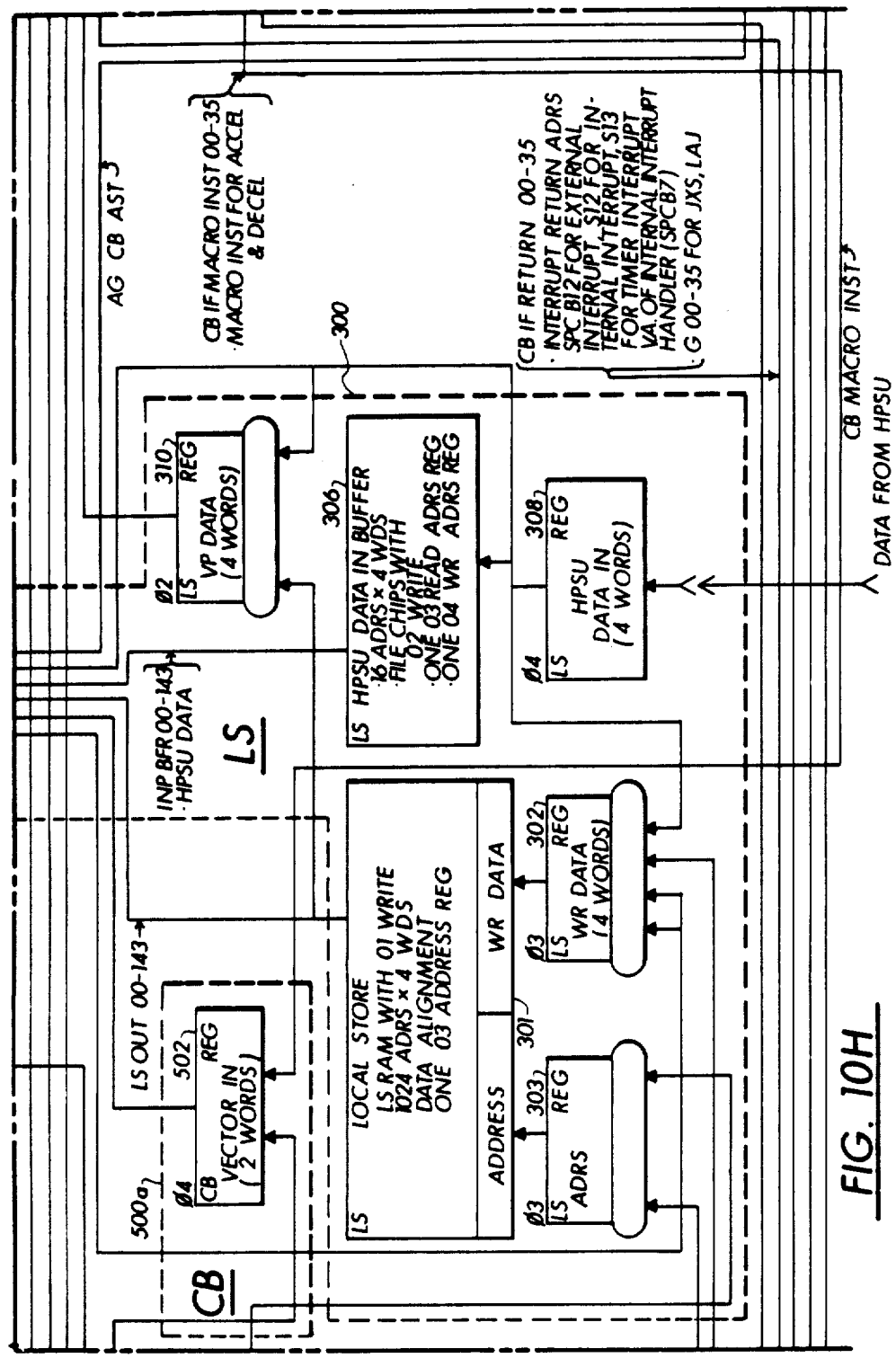
Figure 10I:
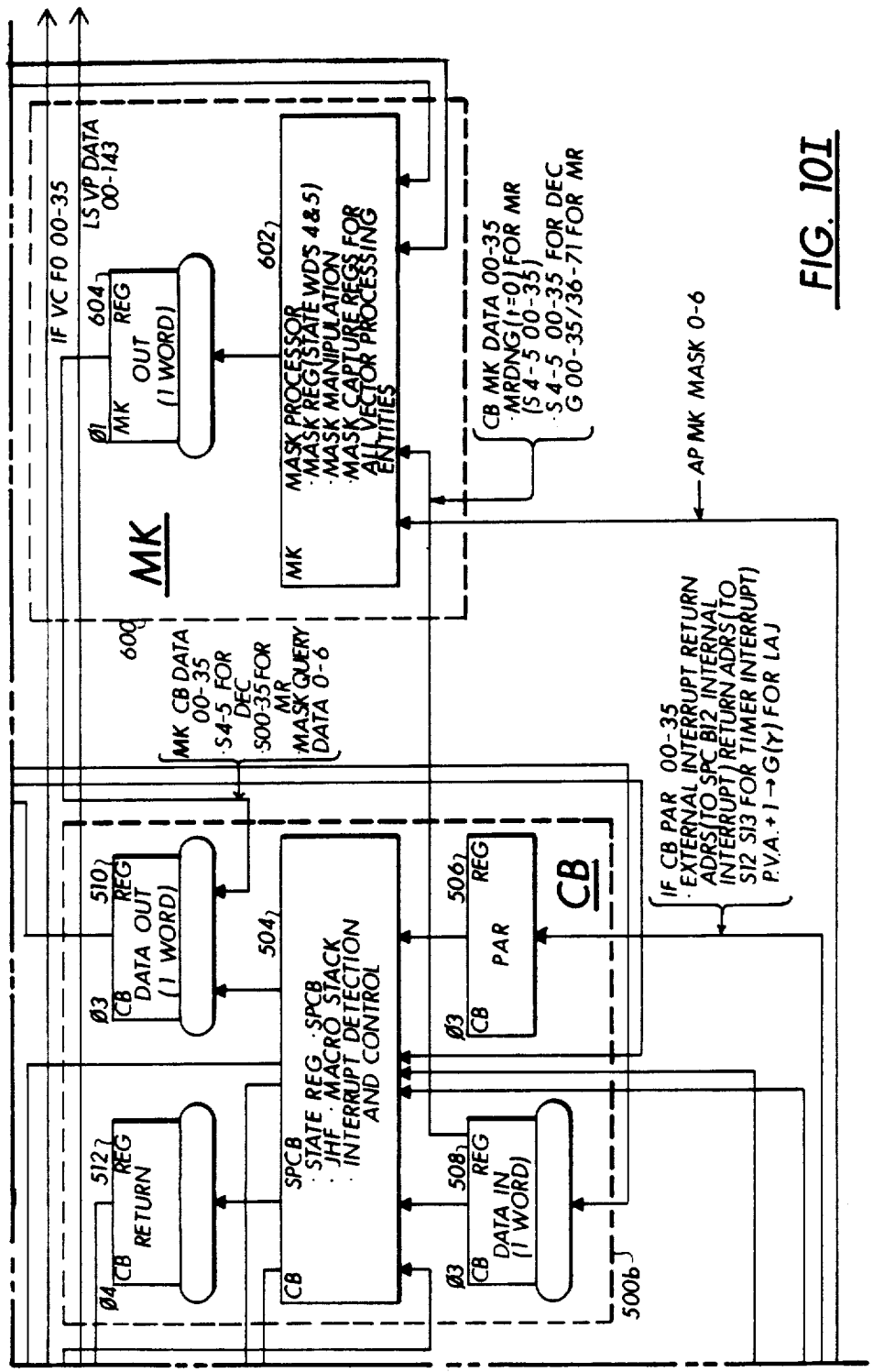

FIG. 10a through FIG. 10i, when arranged as shown in FIG. 10, comprises a logic block diagram of the Scalar Processor Module (SPM) illustrating in more detail the logical arrangement and functioning of the sections illustrated in FIG. 8.

In the more detailed logic block diagrams, activating clock phases are identified adjacent the block symbols.

The Instruction Flow (IF) section is enclosed in dashed block 400, and includes the Instruction Buffer 420, which is a 4096 word RAM organized four words wide, and also containing the instruction decode mechanism which is primarily decode logic. Associated therewith are three interface registers which include the Write Data Register (WR DATA) 404 for the instructions that are written into the Instruction Buffer on a four word basis; Buffer Address Register (BUF ADRS) 406 for receiving the address for instructions which are to be read out of or written into the Instruction Buffer; and the FO Instruction Register 408. The instructions always are read from the Instruction Buffer for execution. The Program Address Register (PAR) 410 holds the Address of the instruction to be executed and the Jump Register 412 holds the jump-to Address. These addresses are translated by Instruction translate circuitry 414, where a virtual Address is determined. The P Register 416 holds the 36-bit virtual address, and the Call Register 418 holds the Control Block program Address.

The Instruction Buffer 402 is organized into sixteen pages of 256 instructions per page. The first 256 addresses are page 0, the next 256 addresses are page 1, and so forth. In the Instruction translate circuitry 414, the page Content Addressable Memory (CAM) is fully associative on the page bases. That is, the most significant 28-bits of the address are actually used in a CAM look-up. The architecture does not allow modifying instructions so the instructions within the Instruction Buffer are never sent back to storage, but they are invalidated after use.

Included in the IF section is the page replacement section (see block 414). Normally the replacement algorithm determines that a start is made at the first page, whenever instructions are first brought in for an activity. Any additional instructions that are required for the next page goes onto page one, the next page into page two, and so forth until all of the pages are used up. Basically, if a new page is required, then one page must be invalidated and the select mechanism chooses which one will be replaced based on the Age algorithm.

The Local Store (LS) section is shown enclosed in dashed block 300, it includes the Local Store circuitry 301 consisting of a 4096 word RAM organized at 1024 addresses by four words wide, so it is possible to read or write one to four words per reference. A data mechanism for aligning the data is included. It can arrange or interchange the four words in any selectable order. The Address is received in the Address Register (ADRS REG) 303. The write data is held in the Write Register (WR DATA REG) 302, and the read data is directed to the SP Date Register 304, which is four words wide.

The HPSU Data Buffer 306 in the LS section 300 includes memory circuitry organized on a four word by 16 address basis. It is constructed of separate chips to allow concurrent reading and writing. It is a first-in, first-our buffer and is used exclusively for the Load Multiple instruction for loading multiple G registers, as will be described below. Data from the HPSU is received by the HPSU Data In Register 308, which is four words in capacity. The HPSU data words are available selectively to the Local Store 301, the HPSU Data In Buffer 306, the SP Data Register 304, or the Vector Process Register (VP DATA REG) 310.

The Control Block (CB) section is shown enclosed in dashed blocks 500a and 500b. The Scientific Processor Control Block (SPCB) circuitry is shown as block 504 includes the State Registers which comprise an architectural entity that contain the state of the machine at certain stages of activity execution. Portions of the Scientific Processor Control Block (SPCB) 504 contains information or pointers gated to execute activities. For example, it includes a G op history file which is a record of the jump instructions executed which allows tracing of programs. The Macrostack contains the code used for various internal operatons such as acceleration, deceleration, handling interrupts and so forth. The instructions from the Macrostack are actually transferred in a normal fashion. Also included are the Interrupts, and the Interrupt Detection and Control logic. A separate patent application has been filed concurrently with this application on this Macrostack operation and the contents are included herein by this reference.

The Program Address Register (PAR) 506 receives the address, and the data word is directed to the Data In Register 508 for recording the SPCB. Data read out is directed to the Data Out Regiser 510 (one word), and return addresses are directed to the Return Register 512 for transmission to PAR Register 410 in IF 400. The Vector In Register 502 (in dashed block 500a) receives two words from the Vector Processor Module and is under control of SPCB 540, to transfer received words to the SP Data Register 304.

The Mask Processor (MK) shown enclosed in dashed block 600 includes circuitry in bloek 602 that includes the Mask Registers, which actually are State Word Register 4 and State Work Register 5. Masking allows various alterations and calculations of the fan out into the vector processing entities. It is operative in the Vector Processor Module (VPM) in the Add Pipe line 1600, the Multiply Pipe line 1700, and the Move Pipe line 1800. Additionally, the mask is provided to the Address Generation (AG), shown enclosed in dashed block 700 for load and store vector instructions. Also it accepts data from the Add Piplene in the Vector Processor Module for altering the mask for comparison instructions. The MK Out Register 604 provides one word of data at a time to the Data Out Register 510 in Control Block 500b.

The Address Generation (AG) section is shown in dashed block 700, and includes the Address Translation portion 702 which responds to address information derived from a variety of sources. This includes information from the Activity Segment Table (AST) which is in the form of a RAM; from SPCB 504 of Control Block 500b; from Instruction Flow 400; and from Scalar Processor ALU 900. This AST has to do with information for translating virtual addresses into real storage addresses. It consists of up to 32 four word entries and the number is specified in word 6 of the SPCB 504. The first entry is always for the local store segment. Some of the instruction data contained in each of the entries are lower segment name and the upper segment name, the execute, the read and write address and the length of the segment minus one word. Also included are the instructions for doing an AST Search, which is a portion of the address translation mechanism for translating a virtual address into a real address. It also has the Base File write mechanism as well as the Base File itself. It holds translated real addresses for subsequent usage. There are 16 of these Base Files and they are associated on a one-for-one basis with the 16 general registers or G registers which are architectual entities.

In most instances the virtual address for a storage reference is obtaihed from one of those general or G registers; one of the exceptions, of course, being instruction buffer page misses. In the latter case the virtual address comes from the Instruction Flow 400 section to the ADRS IN Register 704, included is the Address Generation section. There the base files can be read for subsequent usage of a previously translated address. The Address Generation 700 section is where the contents of the base file are passed to form an address to either the HPSU via the HPSU ADRS Register 710, or to the Local Store 300 via the LS ADRS Register 712. Limit check hardware is also included in Address Translation 702 to make sure that the request is within the segment. If the request is outside the segment an interrupt is initiated. It also contains the Index Buffer which is used for the Vector Index Store and Index Load instruction which contains the vector of indexes into the segment. From the HPSU ADRS Register 710, the address is interfaced by cable to the High Performance Storage Unit. If the request was to an address in Local Store 300 then the LS ADRS Register 712 is utilized. The input from the Vector Processor is where most virtual addresses are sent to the Address Translation section 702. The AST Reference Logic 714 provides access (AG CB AST) to the Control Block SPCB 504.

The Store Buffer section (ST) is shown enclosed in dashed block 800. ST includes the Store Buffer 802 which is a buffer that allows simultaneous read and write of data. It is organized four words wide by 16 addresses. The data coming from the Vector Files of the Vector Processor Module is where a Vector Store instruction is entered into the four word FILE WR DATA Register 804. It is temporarily written into the Store Buffer 802 and from there the data is then transferred out through the HPSU Date Register 806 four words at a time to the HPSU. The HPSU output data register accomplishes the data alignment in that it can rearrange the four words out of the Store Buffer 802 in any arrangement. This section also has an output 808 to the Local Store 300, in case, the address that was formed in the Address Generation section 700, was for Local Store rather then for the HPSU. The ST DATA Register 810 provides an output 812 to IF 400 if the words are to be stored in Instruction Buffer 402.

The SPALU 900 section is enclosed in dashed block 900, contains four major sub-sections. The G Register File 902 is an architectual entity, that includes 16 G Registers constructed of chips to allow simultaneously read and write. It is organized 2 words wide by 16 addresses.

The Scalar ALU 904 is constructed of ALU Gate Arrays and has a capability of doing various arithmetic and logical operations. It is this section that executes or participates in execution of most scalar instructions, however, it doesn't handle scalar multiply, shifts, or floating-point multiply instructions.

The Scalar ALU 904 receives a two-word input from the ADDEND Register 906 and a two-word input from the AUGEND Register 908, and produces a two-word output to the ALU OUT Register 910.

Scalar floating point manipulation is accomplished by the Scalar Processor FP Characteristic Manipulation 912 Gate Arrays, and the Scalar Processor Multiply Array 914, which accomplishes either integer or mantissa multiply operations; and drives the Product Out Register 920.

The Scalar Processor FP Characteristic 912 circuitry drives the Shift In Register 916 which controls the shifting of the Scalar Processor Shifter 918.

The floating point Augend is provided through the Floating point Augend Register (FA AUG) 922, and the addend is provided through the Floating Point Addend Register (FA ADD) 924.

The Loop Control (LC) section is shown enclosed in dashed block 1000. The Loop Control Register (LCR) section 1002 generally contains eight Vector Loop (VL) registers, eight Element (EL) registers, the Current Vector Loop Pointer (CVLP) register and the Current Element Pointer (CELP) register. The Current Vector Loop Pointer register selects one of the eight Vector Loop registers from which the Element count is formed for vector instructions. The Current Element Pointer register selects one of the eight Element registers from which the element point is formed. Additionally, there is the element count formation logic and the element point formation logic. Also included is the logic for detecting the element count equal to 0 or the element count or pointer of a given range. LCR 1002 provides output to Register 1004, and receives input from Register 1006.

Having described each of the eight logical sections of SPM, the overall operation will be described with reference to FIG. 8 and FIG. 10.

The Address Generation section 700 does all of the address translation and the generation for all references made to memory for operands and instructions as well as for some references to Local Store 300. The Address Generation section contains the activity Segment Table (AST) 702.

The Control Block (CB) 500 section of the Scientific Processor (SP) contains the state or S registers and the CB registers. It handles interrupt detection and response and essentially provides control to the SP at any given time.

The Instruction Flow 400 Control section is the heart of the machine. It initiates the execution of all of the instructions and includes the Instruction Buffer 402.

The Loop Control (LC) 1000 section contains the Loop Control registers 1002 and does all processing on those registers.

The Local Store (LS) 300 section physically houses the Local Store RAM 301 and also contains the HPSU Data Input Buffer 306 and the HPSU Data Input Register 308.

The Mask Processor (MK) 600 section contains the Mask Registers 602 which are State Register S4 and S5 and it Performs all processing on those registers.

The section on the Scalar Processor Arithmetic Logic Unit (SPALU) 900 includes the G Registers 902 and performs all Scalar processing in the machine.

The Store Buffer (ST) 800 section is the final section and it contains the buffer for the data that is being sent back to memory. It includes the HPSU Data Register 806 for output from the SP.

The functionality of the Address Generation 700 section must accommodate several instruction types. It does the address generation and translation for all format instructions. There are three formats for instructions, one is the RS format, the second is the RR format and the final one is the VV format. The RS format generally means that the operation requires one Register operand and one Storage operand, thus the term RS.

The RR format means that the operands both come from Registers, while the VV format usually means that the operands come from Vector Registers, however the load vector is also a VV instruction.

Turning to the first class of instructions that the AG 700 executes, it accomplishes the operand fetch for all RS format instructions except for the case where the data comes immediately from the Local Store 300. That is the case where the B field of the instruction is 0 or 15 and it has an absolute address less than 4K. As these instruction are explained the complexity of the instructions should be appreciated to understand the difficult tasks that the AG 700 section must perform. On the RS format instruction, for example, it has to, in one instance, get the upper word of the two-word pair, while in another instance it must obtain the lower word of the two-word pair. In still another instance, it must get both words of that pair.

The VV format instruction is involved in many types of vectors. For example, there is the Load Vector, Store Vector, Load Alternating Element Vector, Store Alternating Element Vector, Index Load Vector, Index Store Vector. Further, variables must be dealt with on many of these instructions. These include the stride or index for the indexed loads and stores, the lengthening of an operation. Also, a masking operation might be involved and the type of precision must be determined. The next instruction class includes the Load G Multiple, the Store G Multiple, the Load Control Registers and the Store Loop Control Register. For the Load G Multiple and Store G Multiple there again is a case of single or double precision which is indicated by the the field in the instruction. It will either be a 0 or 1 for single or double precision, respectively. Whenever a page of instructions is not stored in the Instruction Buffer 402, an instruction buffer miss sequence goes into operation and a page load is done primarily by the Address Generation section.

Because of the intimate interaction between the AG 700 section of the SP and the HPSU, it is considered worthwhile to review for a moment the HPSU structure. It has eight (8) banks and four words per bank. One way that this could be diagrammed is to show words 0 through 31 on a line with words 0 through 3 being contained in bank zero, words 4 through 7 in bank one, words 28 through 31 in bank seven, and then words 32 through 35 would end up in bank zero again, words 36 through 39 would end up in bank one, and word 64 again in bank zero. If variables are on these banks and words, N could be assigned to the word in bank m, to bank 1 and to the block address where block is our four hung across memory. Generally, this formula would have the word in a bank number, the bank number for an address, and the block address. The possible range on these variables is as follows: N is 0, 1, 2, or 3; M is 0 to 7 from banks 0 through 7 and the block address which would form 0 to 2 17th minus 1, with the largest address being 4 million minus 1. An example of a calculation of the block address, bank address, and word address is helpful. Choosing 1107 as a number, this would be located in the 34th block, in the 4th bank and it would be the third word in that bank.

The HPSU interface is capable of transferring four words per request. The AG 700 section has to send out four requests the absolute address noted above minus the final two bits of it, so a 22 bit address is created. It is the bank address and the block address combined that is sent out. When it sends out for the four words to be read, not all of the information is there, since the bottom two bits of this address are missing. Those bottom two missing bits are essentially a set of four mask bits in the AGSI function register. The top four bits of this 6 bit register are the write field for the four words sent out by the AG section to the memory.

The functions of the Address Generation 700 section will not be summarized. First, it does an AST lookup. This means an Activity Segment Table lookup and it starts with either a G Register for Base Register or a G Register plus an offset amount from the instruction. The instruction includes a U field and that is the offset field of the instruction. So an AST lookup is done with a U base register or the base register plus offset from the instruction. It tehn calculates a virtual segment offset and then adds the virtual segment offset to the real base address. The next function that must be performed is link checking to determine whether the references are within the AST entry. It also must do permission bit checking, since each block of memory that the SP can access has three bits associated with it to indicate whether you can read that section, write that section or execute instruction from that section. When the Address Generation section is involved in a Vector Load it has to do a calculation for addresses. First it calculates the base plus virtual segment offset, so that it is the first clock of four words that it gets back from memory. The next clock it starts with the base plus the virtual segment offset and replace the virtual segment plus base with the new calculation. In the case of an Index Vector Load it would add the index to the base plus virtual segment offset. There is a new calculation going on for a Load Vector. The same thing applies to a Store Vector.

The next function that the AG 700 section performs is the control of the data path for operands returning from the HPSU. There are essentially two buffer areas where these operands may be sent. One is in the Vector Processor Module, and the other is in the Scalar Processor Module. The buffer in the Vector Processor Module is in the Vector Load 1200 section, while the buffer in the Scalar Processor Module is in the Local Store 300 section.

The AG section also maintains shadow G Registers. These are registers that accelerate the acquisition of operands from HPSU. They are translated G Registers or base registers located in the Address Generation 700 section.

Another Address Generation hardware feature that should be pointed out is the Tracking Memory feature. This is the feature that controls the data path from memory (HPSU) for items returning from main memory (HPSU). For every request to main memory there is exactly one entry in the Tracking Memory, and the contests of that Tracking Memory controls the data paths, the selectors and the MUXes for the data path along which the operand travels. The load select memory feeds the Tracking Memory with information for that purpose.

Another memory in the AG section that should be noted is the Source Select Memory. The contents of that memory are not stored anywhere rather they are used immediately and eliminated. The Store Buffer 800 section contains the HPSU Data Register 806 for transferring the operands to the HPSU.

The ST 800 section contains a Store Buffer 802 for operands being sent to an HPSU. Again this section is primarily controlled by AG 200.

The next section is the Local Store (LS) 300 Section. This section is controlled primarily by outside sections, it contains the storage interface to Local Store data array (RAM) 301. It physically contains the a 4K Local Store RAM 301, and includes the HPSU Data Input Buffer 306. It is controlled by the Instruction Flow 400 section and the Address Generation 700 section. The Address Generation 700 section operates in conjuction with the Store Buffer (ST) 800 and Local Store (LS) 300 sections.

The next section is the Scientific Processor Control Block (CB) 500 section. Following is a list of the instructions in which it is involved. First, it is used in the Move instruction. It is also involved in an Advance Local Store Stack instruction, and a Retrack Local Store Stack instruction. It should be recalled that it contains the CB section which includes the State Registers 504 (S Registers). One of the S Registers contains the Local Store pointer. The CB section controls acceleration and deceleration and it has macro codes for that purpose. The macro code looks very much like normal instructions and it operates very much like a normal instruction, however, the machine is put into an acceleration or a deceleration mode when these instructions are executed. The Control Block is involved with every instruction that has a possibility of a fault. Those instructions are the Floating Point Add and Subtract, the Integer Add and Subtract, the Floating Point and Integer Multiply and Divide; and any RR format instruction where a Vector Register length can occur. This includes every RR format instruction and similarly every VV format instruction. The Control Block section is also involved in the Load Address and Jump instruction of the Jump External Segment instruction. CB controls registers S6, S7, S11 and S14. The S6 Register has the Scalar condition code bits. The S7 Register contains the pointer to the Local Storage stack. The S11 Register can change the mode of the machine to and from slow mode to fast mode.

The SPALU 900 section is involved in all RS format instructions as well as the RR format scalar operations. Those instructions include the Add, Subtract, Multiply, Divide, Conversions, Sign calculations, Absolute Value, Shift and Compare, as well as logicals and scalar loads and stores. The SPALU section is involved in all moves except Loop Control internal moves. The SPALU 900 contains the G Registers 902. Other instructions that would access a G Register, for example, are VV format instructions that require one or more G Operands instead of Vector Operands. Also any instruction that accesses the HPSU needs a Base Register which all come from the G Register file 902. The SPALU is involved in all but six instructions in the machine.

The SPALU section contains the G Registers 902 and it resolves Read/Write conflicts and also Write/Write conflicts. The ALU Out Register 910 is a very important register in the SPALU section. It is important because most of the traffic in SPM goes through that register.

The Mask (MK) 600 section contains the Mask Processor 602, which includes the Mask Registers used for holding the State Words S4 and S5. In fact it is the top 32 bits of S4 Register and the top 32 bits of S5 Register. The Mask Processor is involved in almost all VV format instructions because those require masks. A list of these instruction: are the Add/Subtrat; Multiply/Divide, Absolute Value, Move and Move Negative, Shift Count Leasing Signs, Logical, and Compare. In the Compare instruction, the Mask is set out at the beginning of the operation and the Mask is changed during the operation. In other words, the Mask is both the source and a destination in this operation, i.e. the Compare puts results back into the Mask Register.

The Mask Processor sends mask bits to the Add Pipe 1600, to the Multiply Pipe 1700, and to the Move Pipe 1800. It has three interfaces to the Vector Processor and it sends the full Mask to the Address Generation 700 section. The Loop Control 1000 (LC) section contains Loop Control Registers 1002, including the Vector Length Registers and the Element Length Registers, the Current Vector Loop Pointer, and the Current Element Loop Pointer. It also contains shadow Loop Control Registers.

The term "shadow" is used herein to define a group of additional backup registers. They are used in very much the same sense that the Loop Control (LC) registers are, but they are additional registers which are only used during acceleration and deceleration operations. The Loop Control 1000 section is also involved in RR moves, and it does Loop Control moves internally to increase the speed. It performs the processing for the Begin Vector Loop instruction, Jump Vector Loop instruction, Begin Element Loop instruction, Jump Element Loop instruction, the Adjust Current Vector Loop Pointer instruction, the Adjust Current Element Loop Pointer instruction, and the Adjust Both Vector and Element Loop Pointer instruction. It is also involved in an additional Jump. So there are actually four instructions where the Loop Control section is involved in Jump operations.

The last section to be discussed is the Instruction Flow (IF) section, 400 which is essentially the heart of the machine. It contains the Instruction Buffer 402 and initiates execution of all instructions. It does most decode operations. It sends out control words to the various other sections of the machine like the SPALU 900 section, the VC 1100 section in the VPM, and it sends out instruction valid bits. Of course, it does all of the Jumps, and the final execution of the Jumps.

The data flow portion of the Scalar Processor Module are the paths on which data travels when instructions are executed. Some examples will be described.

First, consider the path on which the data travels for a Move, namely a move from S3 Register to G4 Register, although the specific numbers of these registers does not matter. The data will start in the CB 500 section. From there it will go to a register in the SPALU section. This would be the register in which multiple results are placed when a Multiply is done, however, it is used also for transferring operands on many of the Move instructions. It goes from there to the SPALU Out Register 910. The SPALU Out Register 910 is essentially the Write Data Register for the G Register File 902. It is the path for the Move from S3 Register to G4 Register. If the Move were from S4 Register to G4 Register, then the data would start in the Mask Processor 602 and would leave the Mask Processor to the MK Data Out Register 604. From there it goes to the CB 500 section as selected by the CB Data Out Register 510. Thereafter it follows the remainder of the path that the previous Move discussion covered.

In a Move from G5 Register to S4 Register there will be an Address sent to the SPALU 900 section from the Instruction Flow 400 section. This will go into the SP G Register File 902 in a Read Address Register. From there it will be read out to G5 Register from the G Register File 902, where it will go into the SP Augend Register 908 and from there it will go down to CB Data In Register 508. Finally, it will be transferred over to the Mask Processor and will enter through the MK Data In Register (not shown).

Figure 11H:
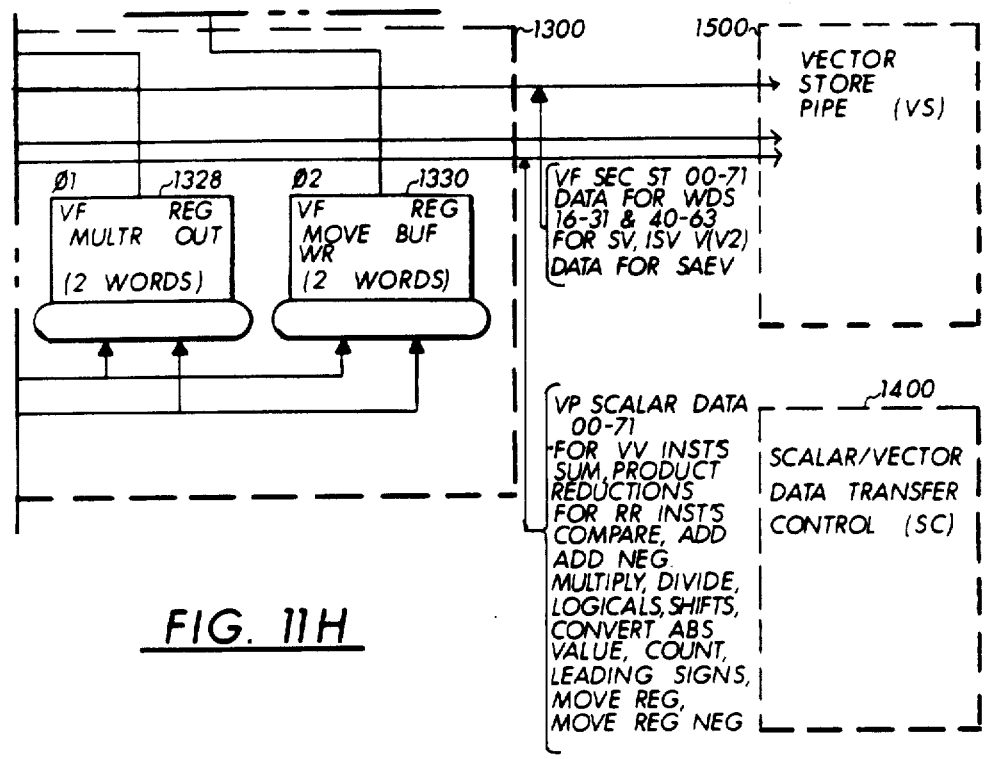
Figure 11:
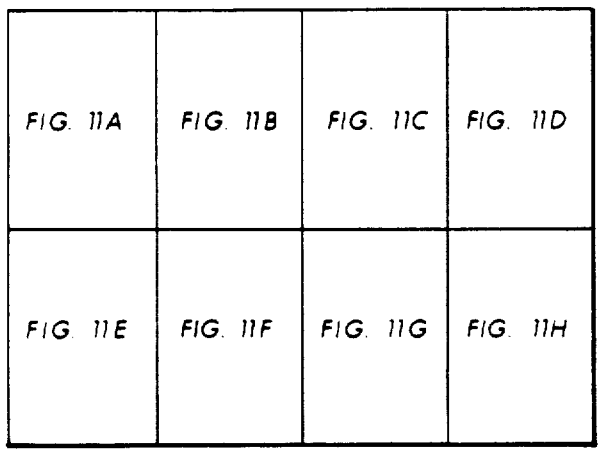
FIG. 11 is a logic block diagram of the Vector Processor Module (VPM) illustrating in more detail the logical arrangement and functioning of the sections illustrated in FIG. 9.
Figure 11A:
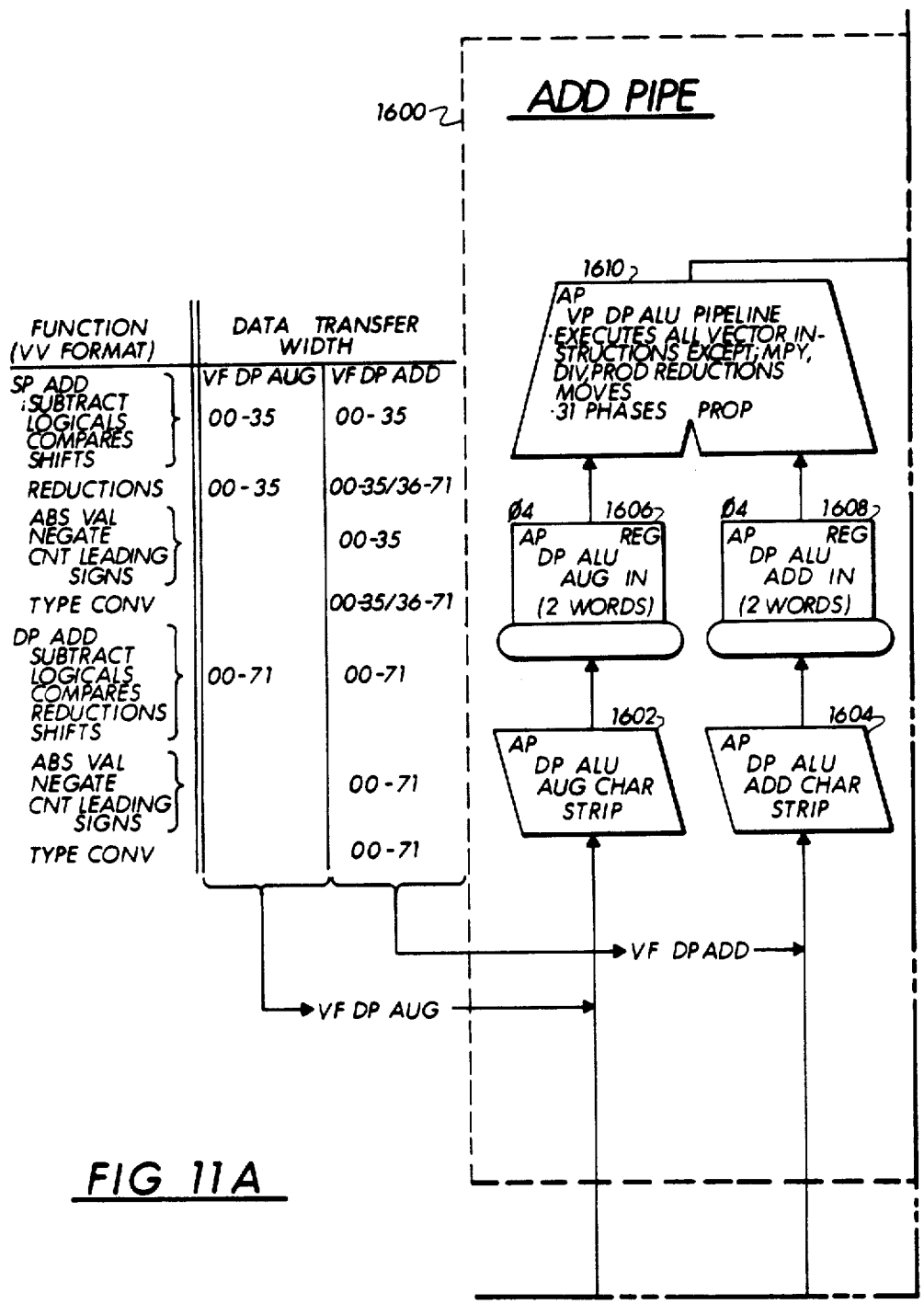
Figure 11C:
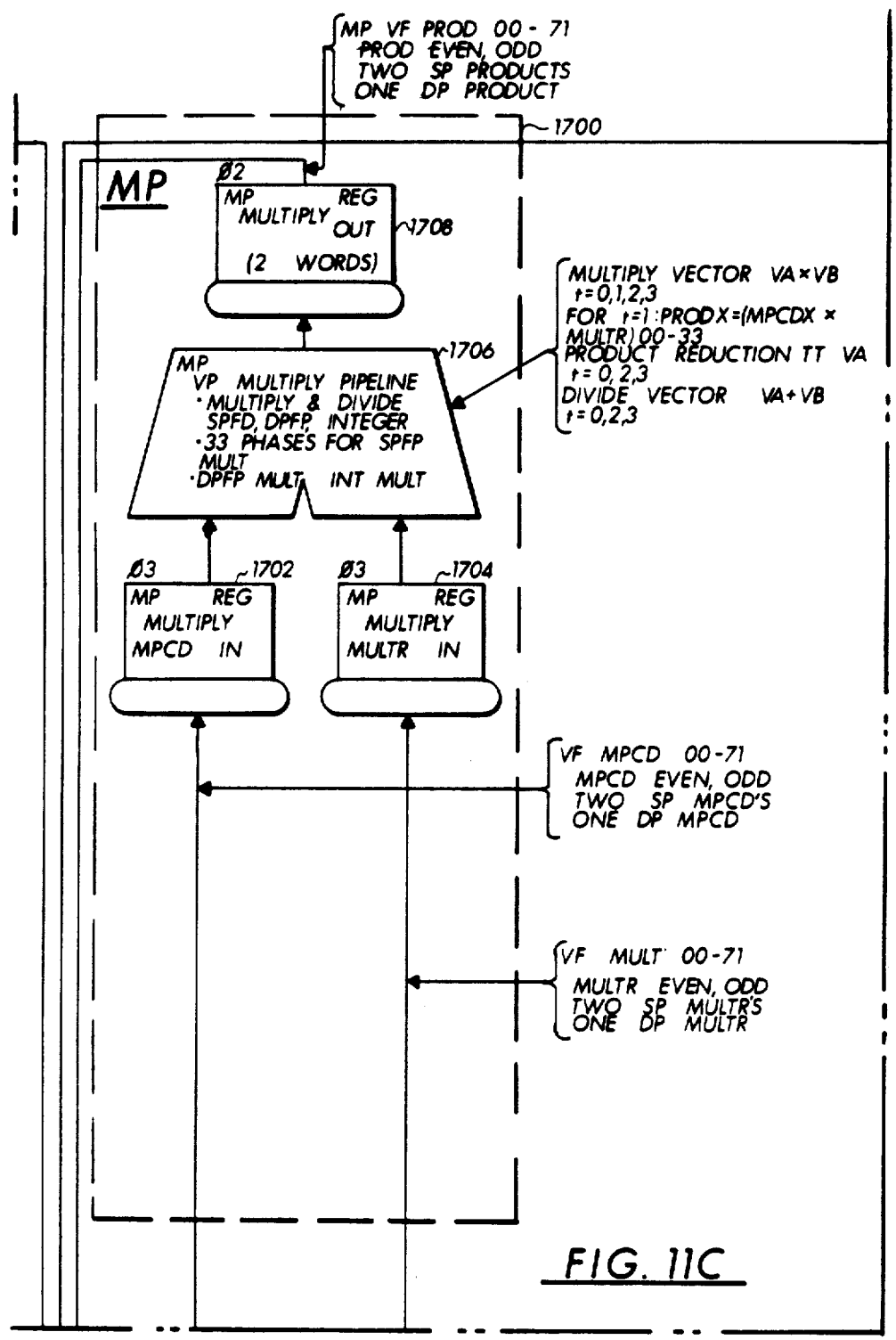
Figure 11D:
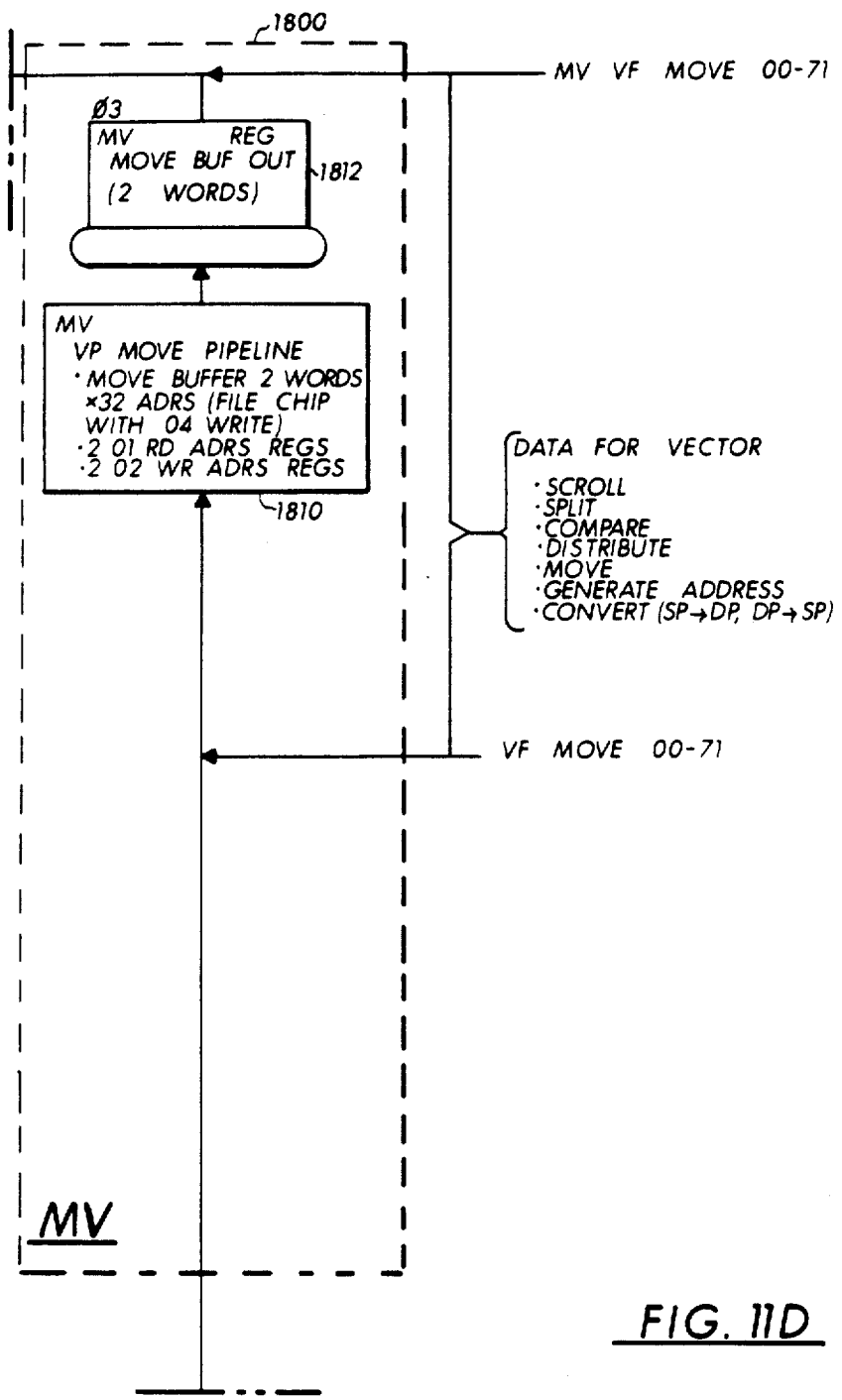
Figure 11E:
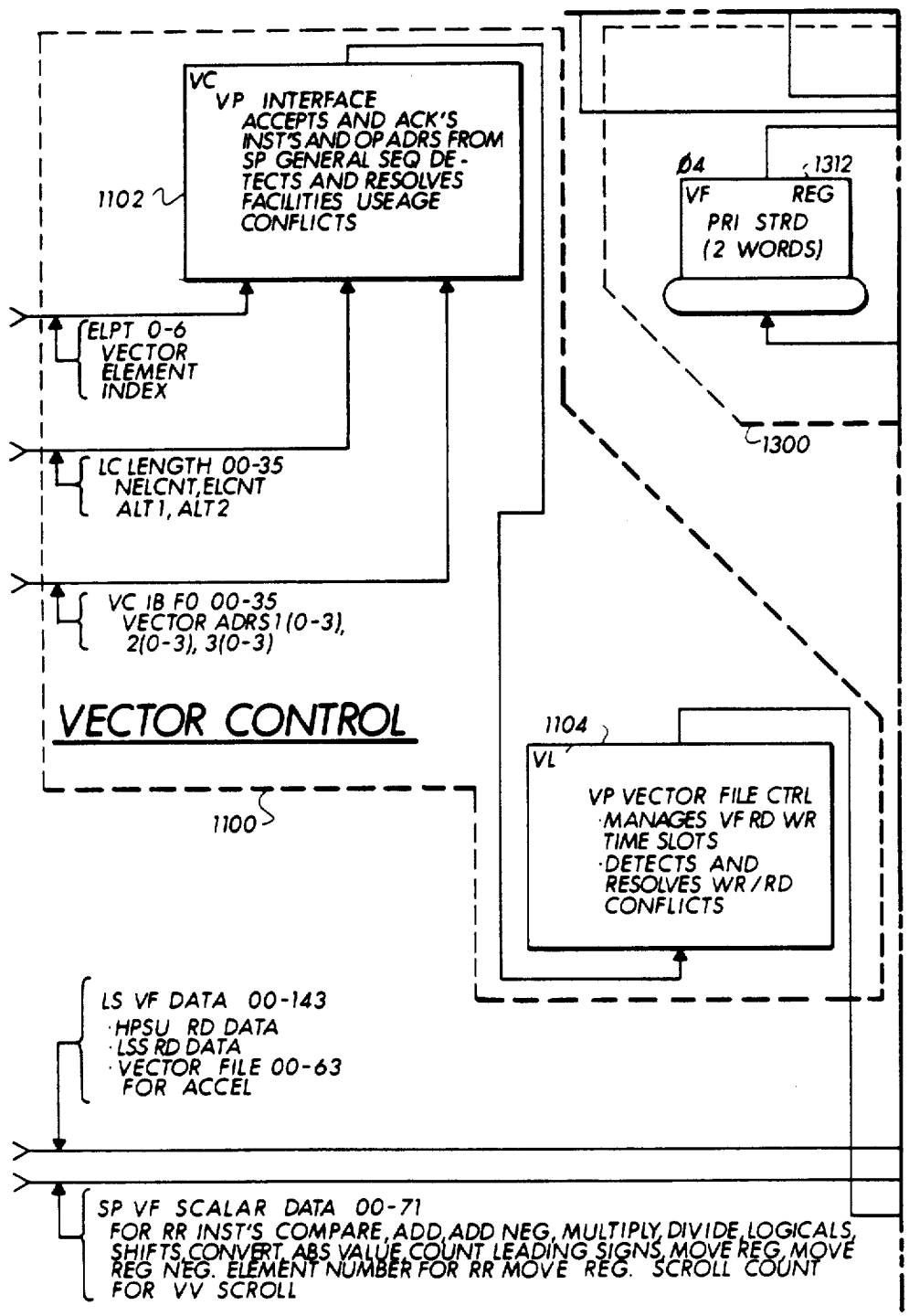
Figure 11F:
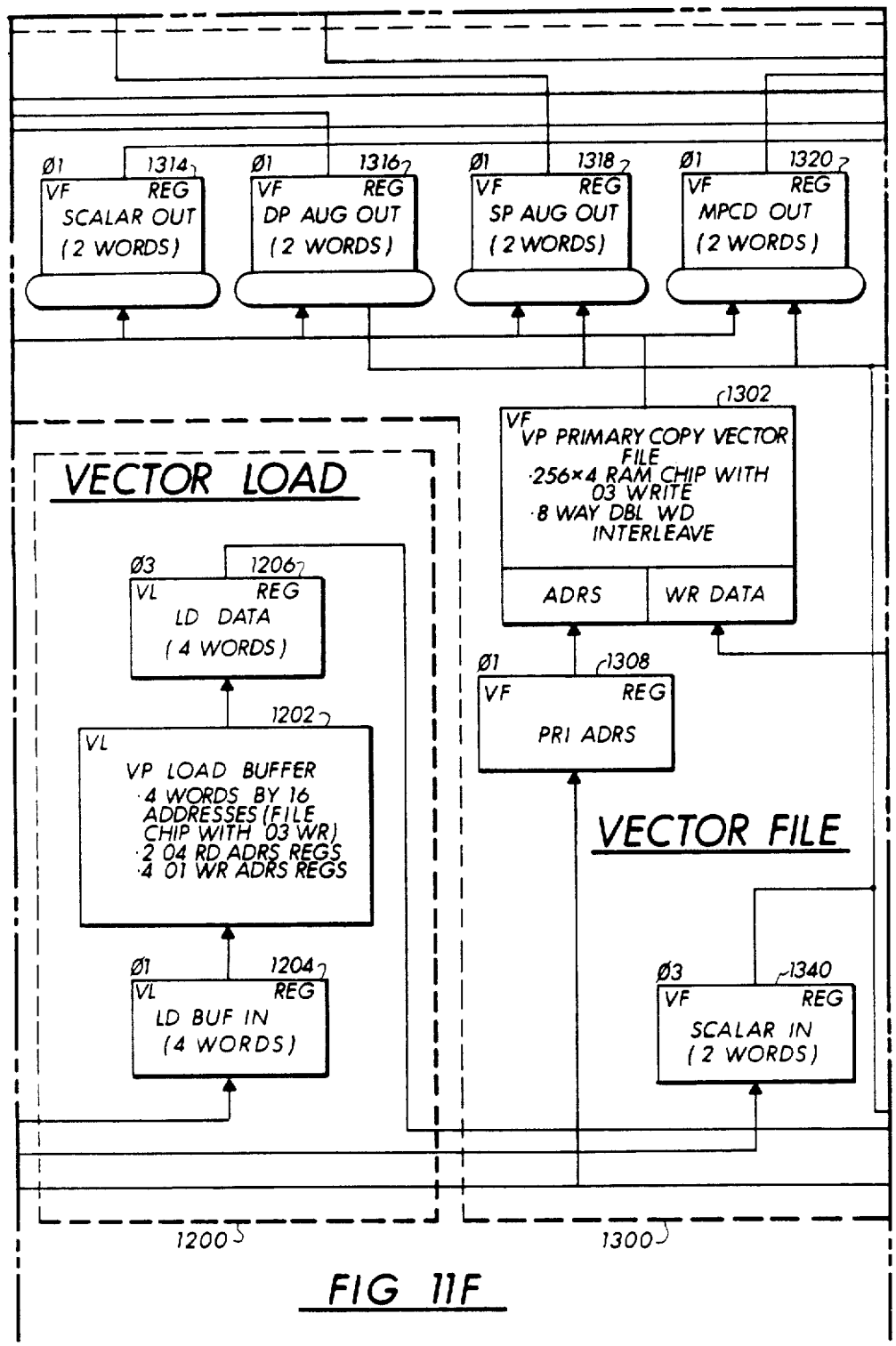
Figure 11G:
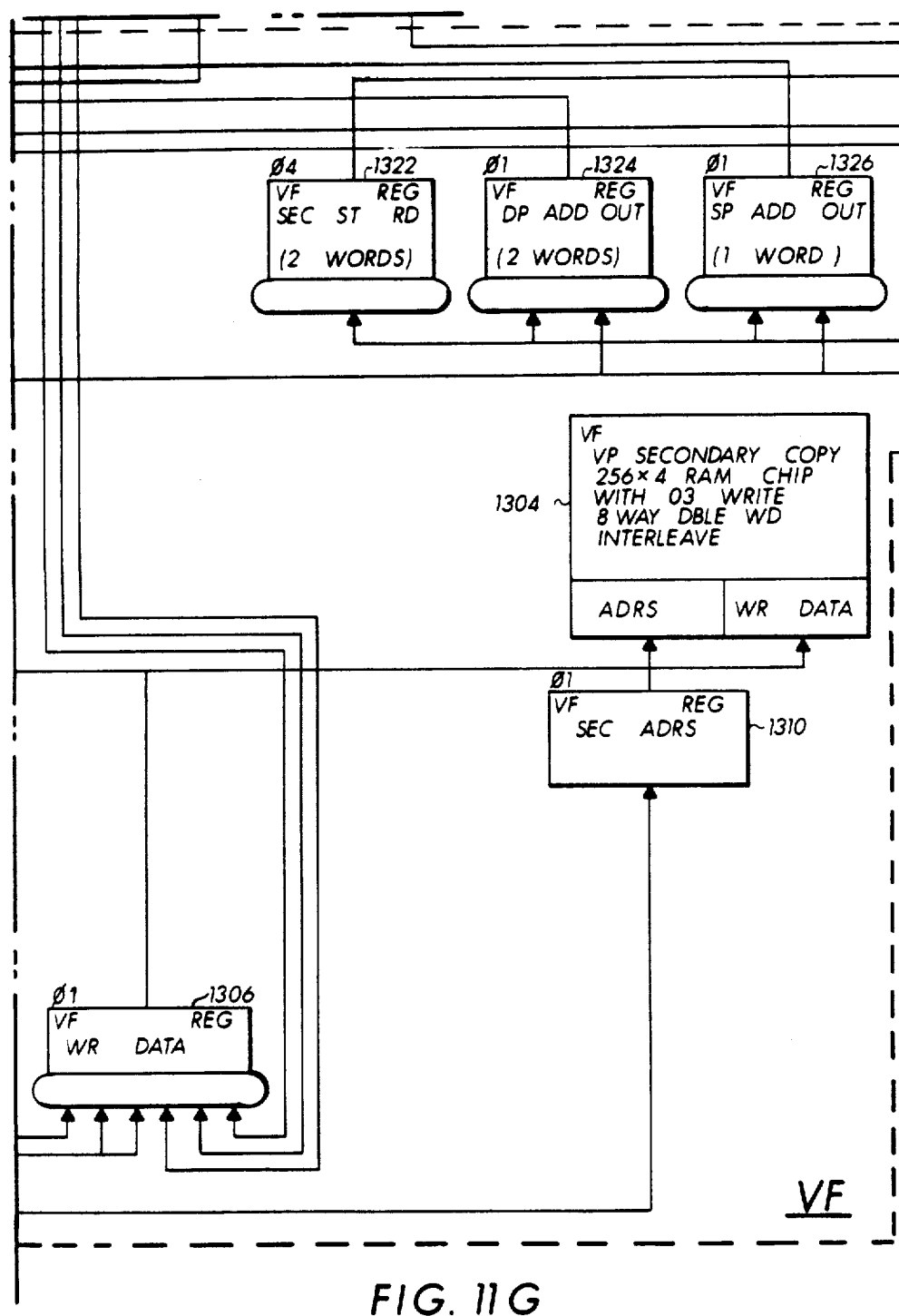

FIG. 11A through FIG. 11H, when arranged as shown in FIG. 11, comprises a logic block diagram of the Vector Processor Module (VPM) illustrating in more detail the logical arrangement and functioning of the sections illustrated in FIG. 9.

The Vector Control (VC) section is shown enclosed in dashed block 1100, and includes the VP INTERFACE 1102 circuitry which accepts instructions and Element Pointer, Element Count and Abort information from the Scalar Processor Module 150, the Instruction Flow (IF) 400 an the Loop Control 1000. It also acknowledges instructions when they are placed into execution. The VP INTERFACE 1102 also forms the second instruction for multiple-pipe instructions where two pipelines participate in execution of certain instructions, such as single precision conversions or the indexed Load Vector. The Vector Control (VC) section 1100 also includes the VP Vector File Control 1104 which reserves the Vector File time slots that are required for instructions. The pipelines themselves are released when the instruction is finished. It selects Vector File address per time slot management assignments and detects logical data usage conflicts.

The Vector Load (VL) section is shown enclosed in dashed block 1200, and includes the VP Load Buffer 1202; Load Buffer In Register (LD BUF IN) 1204 capable of handling four words; and a Load Date Register (LD DATA) 1206, also capable of handling four words.

The Vector Files (VF) section is shown enclosed in dashed block 1300, and the storage is implemented from 256 by 4 RAM chips. They are organized on a word-pair basis with an 8-way double word interleave, such that during any clock cycle up to eight (8) Reads or Writes are being accomplished.

The VP Primary Copy Vector File 1302 and the VP Secondary Copy 1304, each selectively receive data from the WR Data Register 1306, and are provided addresses from Primary Address Register (PR1 ADRS) 1308, and Secondary Address Register (SEC ADRS) 1310, respectively. The VP Primary Copy 1302 provides operands for the Primary Store Read (PRI STRD) Register 1312; the Scalar Out Register 1314; the Double Precision Augend Out (DP AUG OUT) Register 1316, the Single Precision Augend Out (SP AUG OUT) Register 1318, and the Multiplicand Out (MPCD OUT) Register 1320. The VP Secondary Copy 1304 provides operands for the Secondary Store Read (SEC ST RD) Register 1322; the Double Precision Addend Out (DP ADD OUT) Register 1324; the Single Precision Addend Out (SP ADD OUT) Register 1326; the Multiplier Out (MULTR OUT) Register 1328; and the Move Buffer Write (MOVE BUF WR) Register 1330. For example, as will be later discussed the VP Primary Copy 1302 provides the operands for the Add Pipe 1600, the Multiplicand for the Multiply Pipe 1700, and the Scalar Data Out, which is data going to the Scalar Processor Module. It also provides the primary store data for Vector Stores. This is routed to the Store Buffer 802 in the Scalar processor Module.

The purpose of two copies in the VP primary Copy 1302 and the VP Secondary Copy 1304 is to enable the simultaneous reading of two operands. For example, the VP Primary Copy provides the Augends for the Add Pipe 1600 and at the same time the ADdends can be read out from the VP Secondary Copy. Likewise for the Multiply Pipe 1700, the Multiplicand is read from the VP Primary Copy 1302 of the Vector Files, while the VP Secondary Copy 1304 provides the Multiplier. Additionally, data is provided to the Move Pipe 1800, which only gets one operand, and also to the Scalar Primary or Secondary Store Vector instructions. The data is routed from here to the Scalar Processor Module into the Store Buffer 802. This works in conjunction with the Primary Store Data Register 1312 so that data can be transferred at a rate of four words per clock cycle. There are really eight (8) copies of this Write data, one of them being associated with each of the 8 blocks of the primary and secondary RAMs. Both the Primary and the Secondary copies of the Vector File are always written at the same time. That is, the same file, or elements of the same file, are always written at the same time, so that they contain identical data. The source of operands for writing into the Vector Files is, of course, in the Scalar Processor Module. This may well be the result of an RR format instruction. As will be discussed later, there are two inputs coming from the Load Buffer 1202. This buffer is loaded by Load Buffer Input register 1204 and executes the Vector Load instructions and represents the fact that there are four word transfers per clock cycle. There is input to VP Primary Copy and VP Secondary Copy from the Multiply pipe 1700, and there is also an input from the Move Pipe 1800 and from the Add Pipe 1600.

With reference to the Add Pipe 1600, there are both single precision and double precision arithmetic operations performed by this Arithmetic Logic Unit (ALU). Consider the double precision ALU pipeline first.

The doule precision pipeline includes an Augend character Strip (DP ALU AUG CHAR STRIP) Register 1602 which receives its input from the Double Precision Augend Output Register 1316 of the Vector File and a corresponding Double Precision Addend Character Strip (DP ALU ADD CHAR STRIP) Register 1604, which receives its input from the Double Precision Addend Output Register 1324. The output of registers 1602 and 1604 are respectively sent to the DP ALU AUG IN Register 1606 and the DP ALU ADD IN Register 1608, which provide inputs to the VP DP ALU PIPELINE 1610. It executes the majority of the vector instructions except for Multiply, Divide, Product Reduction, Moves, Vector Load and Vector Store instructions. The double precision pipe is used for both double precision and for single precision operand types, both floating point and integer. It is capable of accepting operands each clock cycle and it provides results starting 31 phases later. Each clock cycle thereafter, one result per clock cycle is provided, either single precision or double precision.

A similar single precision pipeline includes a Single Precision Augend Character Strip (SP ALU CHAR STRIP) and Single Precision Addend Character Strip (SP ALU ADDEND CHAR STRIP) Register 1614. Also there are corresponding Single Precision Augend In 1616 and Addend In 1618 input Registers which enter the VP Single Precision ALU Pipeline 1620. Vector File Output Registers SP AUG OUT 1318 and SP ADD OUT 1316 provide the inputs to the Character Strip Registers 1612 and 1614, respectively.

The outputs of the Double Precision and Single Precision ALU Pipelines 1610 and 1620 are merged in the 2 word ALU Merge Output Register 1622 which provides the final input to the Write Data Register 1306. As to the single precision operation, it is similar in operation to the double precision pipe but its instructions are of the single precision data types. The single precision pipe also produces one result per clock cycle.

Both the single and double precision pipelines accept data and both produce a single precision result each clock cycle. When operating on double precision data types only, the double precision pipeline is executing and it accepts one pair of double precision operands each clock cycle. Of course, it can produce only one double precision result per clock cycle and this is always stored in the Vector Files at the rate of two words per clock cycle.

The Multiply Pipe 1700 executes Multiply, Divide, and Product Reduction instructions with single precision floating point, double precision floating point and single precision interger data pipes. Note that the double precision integer type is missing. That is because the propogation time from the receipt of operands to results of the operation is the same as that for the Add Pipe, namely 31 phases. In the Vector Files the propagation time is 9 clock cycles from the reading of the operands to the writing of the results of that particular pair of read operands. The Multiply Pipe produces one double precision result per clock cycle or two single precision results per clock cycle. The Multiplicands and the Multipliers are received from the MPCD OUT Registers 1320 and the MULTR OUT Register 1328, respectively, via MULTIPLY MPCD IN Register 1702 and MULTIPLY MULTR IN Register 1704, and enter the VP MULTIPLY Pipeline 1706. The Multiply Output Register 1708 provides the signal to the Write Data Register 1306.

The Move Pipe 1800 (MV) is constructed such that concurrent Read and Write operations are allowed. It is organized two words wide by 32 addresses. The Move Pipe executes Move, Compress, and Division distributed instruction. It also participates in single to double and double-to-single precision conversions. The Add Pipe 1600 actually does the execution of the conversion portion and the Move Pipe 1800 participates in proper storing into the input of the Vector Files 1300. The VP Move Pipeline 1810 is basically a Move Buffer two words wide times thirty-two addresses long. It operates with a Move Output Buffer Register 1812 to provide a further input to the Vector File Write Data Register 1306.

The Vector Store (VS) 1500 section is primarily a control logic so there is only an entity shown as such on FIG. 11. It controls the movement of data from the Vector Files 1300 to the Store Buffer 802 in the SPM. It executes Store Vector, Index Store Vector, Store All Writing Elements, and participates in the execution of the Index Load Vector instruction. It is also capable of transferring data at a rate of four words per clock cycle. It is capable of reading two words each clock cycle and providing a total of four words per clock cycle. The Vector Store 1500 section provides and controls the interface into the Scalar Processor Module. The Store Buffer section essentially controls the writing of the data that is being transferred into the Vector Files and also controls the writing of it into itself. The Store Buffer 802 logic in the Scalar Processor Module, then reads the data from the Store Buffer and transfers it to the High performance Storage Unit or the Local Store whichever the destination might be.

Referring back to the Vector Load section 1200, the VP Load Buffer 1202 is organized into four words by 3 addresses. It is constructed of circuit chips to provide the concurrent reading and writing of data. Data from Local Store 300 section and Scalar Processor Module originates from either the High Performance Storage Unit or the Local Store, and data is transferred into the VP Load Buffer 1202. During any given transfer from one to four words can be transferred, and transfers, of course, can occur in every clock cycle. Data from the Load Buffer is transferred into the Vector Files 1300 in four word wide segments, hence it is capable of transferring four words per clock cycle into the Vector File. The purpose of the VP Load Buffer 1202 is to match the data transfer rate into the Vector File. Therefore it can be accepted at any rate from one to four words per clock cycle. The Vector Load 1200 section also executes Vector Load Index Vector instruction and also the Load Alternating Elements Vector instruction.

The Scalar/Vector Data Transfer Control (SC) section 1400 is the Scalar/Vector Data Transfer Control logic that is primarily the control logic so there is only an entity shown on the block diagram of FIG. 11. The Scalar/Vector Data Transfer Control section controls the moving of G Register operands for vector format instructions. It can specify G Register operands and controls the transfer of that data to and from the interface to the Vector File 1300. The data comes from the Scalar Processor Module into this section and from there it can be routed to any of the pipelines. For example, assume that the Multiplicand for the Multiply instruction, is specified as a G Operand and the data is to be transferred into this Multiplicand Register. By holding this data there for the duration of the Multiply instruction, the contents of the G OP Register is replicated into a vector. The Scalar/Vector Data Transfer Control controls the reading and the writing of Vector File operands for RR format scalar instructions that specify the elements within a Vector File. The data transfer path for data going from the Vector File into the Scalar Processor Module travels from the Vector File via the SC. This interface is directly to the Scalar Processor Module. If the results of an RR format scalar are to be written into a Vector File the data would come by this interface. In that case, the data would be read into the appropriate element as specified into both the primary 1302 and Secondary 1304 stores of the Vector File 1300. An additional instruction that the Scalar/Vector Data Transfer Control participates in is the Generate Index Vector. This is where data for the Index is generated in the SPALU within the Scalar Processor Module. This data is transmitted over this interface and ultimately written into the VP Primary Copy Vector File 1302 and VP Secondary Copy Vector File 1304 sections.

Figure 12:
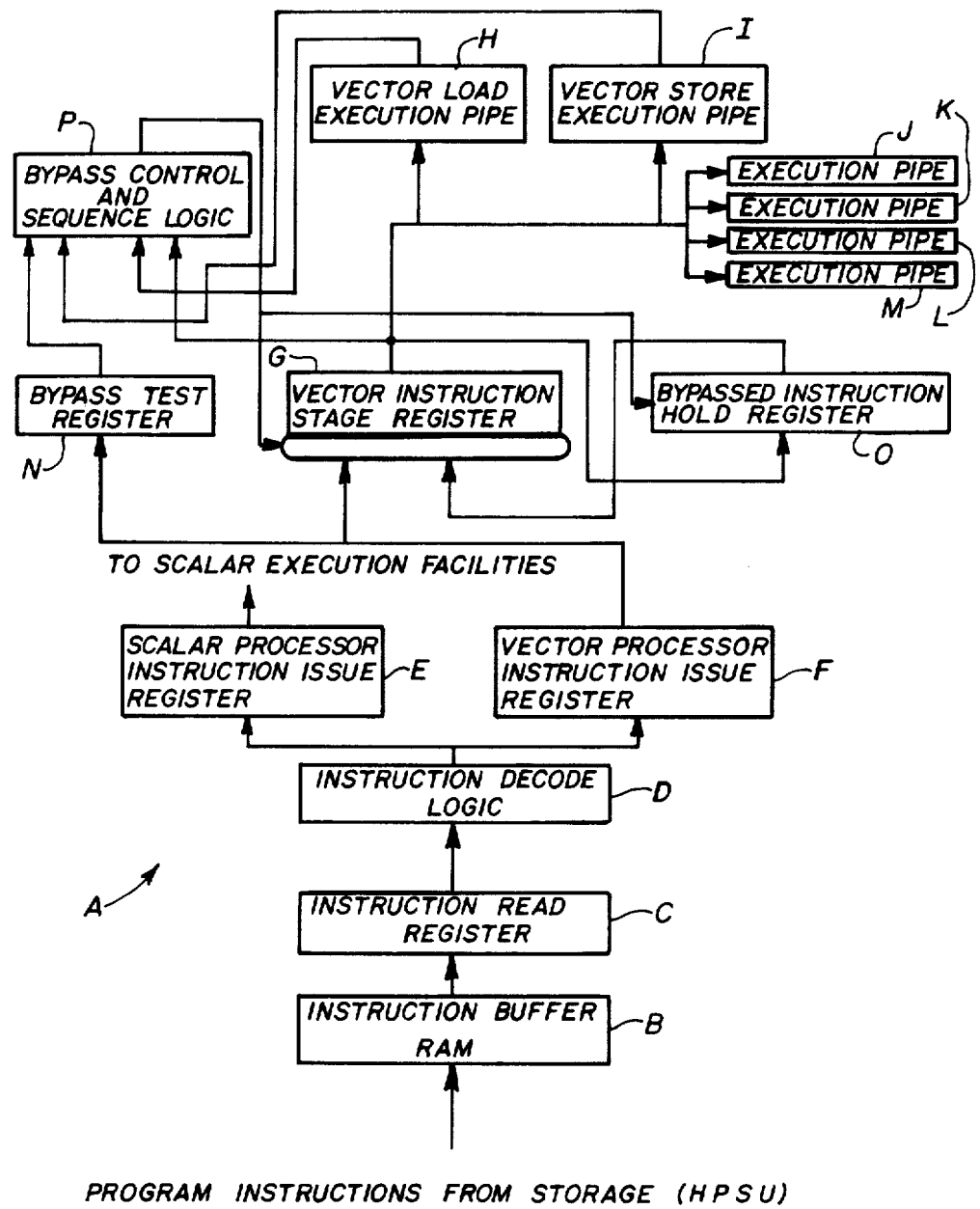
FIG. 12 is a diagrammatic view illustrating an embodiment of the out-of-order program execution apparatus of this invention.

Referring to FIG. 12, an embodiment of an instruction issuing portion of a scientific processor is diagrammatically illustrated and is generally designated A. Instruction issuing portion A generally comprises an instruction cache buffer (RAM) B, an instruction read register C, an instruction decode logic D and scalar and vector processor instruction issue registers E, F, respectively (see items 402, 408, FIG. 10G). A vector instruction stage register G (see item 1102, FIG. 11E) transfers instruction signals to a vector load execution pipe H (see items 1202, 1204, 1206, FIG. 11F), a vector store execution pipe I (see item 1500, FIG. 11H), and four additional execution pipes such as, for example an addition and subtraction execution pipe J (see FIGS. 11A, 11B), a multiply and and divide execution pipe K (see FIG. 11C), an execution pipe L (see FIG. 11D) for moving data from one vector file register to another and an execution pipe M (see FIG. 11H) for moving data between scalar and vector processors.

Instruction issuing portion includes a bypass apparatus for out-of-order program execution to improve performance by initiating instructions into execution out of the normal program sequence. The bypass apparatus includes hardware such as a bypass test register N, a bypassed instruction hold register O and a bypass control and sequence logic means P which permits overlap between both the execution and finishing of program instructions. Each of the registers C, D, E, F, N, G and O, can hold only one instruction signal at any one time.

Instruction signals are received by instruction issuing portion A from an associated high performance storage unit (HPSU). The instructions are of a load vector group and a store vector group.

An example of an instruction sequence that would invoke the bypass apparatus is as follows:

LV V4, G5 (Load Vector File V4, virtual storage address in G 5);

LV V7 G3 (Load Vector File V7, virtual storage address in G3); and

SV V9, G6 (Store Vector File V9, virtual storage address in G6.

Referring to FIG. 12, the steps which would occur with the above instruction are hereinafter described.

Instruction buffer B is connected to receive a first load vector instruction signal V1, a second load vector instruction signal V2 and a store vector instruction signal S1 from the HPSU. Instruction signals V1, V2, S1 are serially received and read by read register C and are decoded by decode logic D. The decoded instruction signals V1, V2, S1 are serially routed to both the scalar processor instruction issue register E and the vector processor instruction issue register F.

Vector instruction stage register G is connected to receive instruction signals V1, V2 from vector processor instruction issue register F. Signals sent to scalar processor instruction issue register E are transferred to scalar execution facilities.

Bypass test register N is connected to vector processor instruction issue register F. Vector load execution pipe H is connected to receive instruction signal V1 from vector instruction stage register G. Also, vector instruction stage register G is a means for holding instruction signal V2 in response to vector load execution pipe H having instruction signal V1.

Vector processor instruction issue register F is a means for holding instruction signal S1 in response to instruction signal V2 being queued in vector instruction stage register G. Instruction signal S1 is transferred to bypass test register N in reponse to an associated clock cycle. Signal S1 is held in register N and is examined or tested by bypass control and sequence logic means P for bypass criteria.

Vector store execution pipe is connected to vector instruction stage register G. Bypass control and sequence logic means P and bypassed instruction hold register O are each connected to vector instruction stage register G. Bypass control and sequence logic means P initiates a bypass sequence and controls transfer of instruction signal V2 from vector instruction stage register G to bypassed instruction hold register O. Instruction signal S1 is released to proceed to vector instruction stage register G and then to vector store execution pipe I in response to bypass control and sequence logic means P transferring instruction signal V2 from vector instruction stage register G to bypassed instruction hold register O.

Instruction signal V2 is returned to vector instruction stage register G for completing the bypass sequence by being either (a) initiated into execution in response to vector load execution pipe H completing instruction signal V1, or (b) bypassed by another store vector instruction signal S2.

Bypass control and sequence logic means P initiates the bypass sequence in response to the following conditions: (a) instruction signal V2 being queued in vector instruction stage register G, (b) instruction signal S1 being queued in vector processor instruction issue register, (c) no conflict of vector file data usage between instructions of signals V2, S1, (d) instruction signal V1 being in vector load execution pipe H, and (e) no instruction signal S1, S2 being in vector store execution pipe I.

The foregoing has described an apparatus for out-of-order program execution for improving the performance of, for example, scientific processors by initiating instructions into execution out of the normal program sequence. This is accomplished by a bypass mechanism and sequence which permits the overlap between both the execution and finishing of program instructions. The result is improved performance without undue complexity and prohibitive hardware cost.

The specific implementations limit the instruction bypass disclosed herein to certain combinations of instructions such as the bypassed instruction being of the load vector group and, the bypassing instruction being of the store vector group. These particular combinations provide the most advantageous cost and performance features.

Having thus described the invention, what is claimed is:

1. A high performance computer apparatus for out-of-order program execution comprising:
   instruction buffer means for receiving program instructions, said instructions including a first load vector instruction signal V1, a second load vector instruction signal V2 and a store vector instruction signal S1;
   an instruction read register connected to receive instruction signals V1, V2, S1 from said instruction buffer means;
   instruction decode logic means connected for decoding instruction signals V1, V2, S1 received from said instruction read register;
   scalar and vector processor instruction issue registers connected for receiving decoded instruction signals V1, V2, S1 from said instruction decode logic means;
   a vector instruction stage register connected to receive instruction signals V1, V2 from said vector processor instruction issue register;
   a vector load execution pipe connected to receive instruction signal V1 from said vector instruction stage register;
   a bypassed instruction hold register connected to receive said instruction signal V2 from said vector instruction stage register;
   a bypass control and sequence logic connected to control routing instruction signal V2 from said vector instruction stage register to said bypassed instruction hold register and again to said vector instruction stage register;
   a bypass test register connected to receive instruction signal S1 from said vector processor instruction issue register and for holding said signal S1 to be tested by said bypass control and sequence logic; and
   a vector store execution pipe connected to receive said instruction signal S1 from said vector instruction stage register.

2. The apparatus of claim 1 wherein said bypass test register receives said instruction signal S1 from said vector processor instruction issue register in response to clock cycles.

3. A high performance computer apparatus for out-of-order program execution comprising:
   instruction buffer means for receiving program instructions from a storage unit, said instructions including a first load vector instruction signal V1, a second load vector instruction signal V2 and a store vector instruction signal S1;
   an instruction read register connected to receive instruction signals V1, V2, S1 from said instruction buffer means;
   instruction decode logic means connected for decoding instruction signals V1, V2, S1 received from said instruction read register;
   scalar and vector processor instruction issue registers connected for receiving decoded instruction signals V1, V2, S1 from said instruction decode logic means;
   a vector instruction stage register connected to receive instruction signals V1, V2 from said vector processor instruction issue register;
   a vector load execution pipe connected to receive instruction signal V1 from said vector instruction stage register; and
   a bypass mechanism including a bypass test register, a bypass control and sequence logic and a bypassed instruction hold register, said bypass mechanism connected to route instruction signal S1 from said vector processor instruction issue register to said vector instruction stage register after signal S1 is transferred to said bypass test register in response to an associated clock cycle, signal S1 being held by said bypass sequence logic and, also under the control of said bypass control and sequence logic, said bypass mechanism routes instruction signal V2 from said vector instruction stage register to return to said vector instruction stage register via said bypassed instruction hold register; and
   a vector store execution pipe connected to receive instruction signal S1 from said vector instruction stage register.

4. The apparatus of claim 3 including:
a plurality of other execution pipes connected to receive instruction signals from said vector instruction stage register.

5. The apparatus of claim 3 including:
a vector load execution pipe connected to receive said first load vector instruction signal V1 from said vector instruction stage register, said vector instruction stage register also being a means for holding said second load vector instruction signal V2 in response to said vector load execution pipe having said first load vector instruction signal V1.

6. The apparatus of claim 5 wherein said vector processor instruction issue register holds said vector store instruction signal S1 in response to said second load vector instruction signal V2 being queued in said vector instruction stage register.

7. The apparatus of claim 6 wherein said store vector instruction signal S1 is released to proceed to said vector instruction stage register and then to said vector store execution pipe in response to said bypass control and sequence logic transferring said second load vector instruction signal V2 from said vector instruction stage register to said bypassed instruction hold register.

8. The apparatus of claim 3 including:
a plurality of other execution pipes connected to receive instruction signals from said vector instruction stage register; and
a vector load execution pipe connected to receive said first load vector instruction signal V1 from said vector instruction stage register, said vector instruction stage register also being a means for holding said second load vector instruction signal V2 in response to said vector load execution pipe having said first load vector instruction signal V1.

9. The apparatus of claim 3 including:
a plurality of other execution pipes connected to receive instruction signals from said vector instruction stage register;
a vector load execution pipe connected to receive said first load vector instruction signal V1 from said vector instruction stage register, said vector instruction stage register also being a means for holding said second load vector instruction signal V2 in response to said vector load execution pipe having said first load vector instruction signal V1; and
wherein said vector processor instruction issue register holds said vector store instruction signal S1 in response to said second load vector instruction signal V2 being queued in said vector instruction stage register.

10. The apparatus of claim 3 including:
a plurality of other execution pipes connected to receive instruction signals from said vector instruction stage register;
a vector load execution pipe connected to receive said first load vector instruction signal V1 from said vector instruction stage register, said vector instruction stage register also being a means for holding said second load vector instruction signal V2 in response to said vector load execution pipe having said first load vector instruction signal V1;
wherein said vector processor instruction issue register holds said vector store instruction signal S1 in response to said second load vector instruction signal V2 being queued in said vector instruction stage register; and
wherein said store vector instruction signal S1 is released to proceed to said vector instruction stage register and then to said vector store execution pipe in response to said bypass control and sequence logic transferring said second load vector instruction signal V2 from said vector instruction stage register to said bypassed instruction hold register.

11. A high performance computer apparatus for completing a bypassing operation of out-of-order program execution comprising:
an instruction buffer;
means connected for reading a first load vector instruction signal V1, a second load vector instruction signal V2 and a store vector instruction signal S1 from said instruction buffer;
means connected to said reading means for decoding said instruction signals V1, V2, S1 and routing said instruction signals V1, V2, S1 to a scalar processor instruction issue register and a vector processor instruction issue register;
a vector instruction stage register connected to receive said instruction signals V1, V2 from said vector processor instruction issue register;
a bypass test register connected to said vector processor instruction issue register;
a vector load execution pipe connected to receive said instruction signal V1 from said vector instruction stage register, said vector instruction stage register also being a means for holding said instruction signal V2 in response to said vector load execution pipe having said instruction signal V1, said vector processor instruction issue register being a means for holding said instruction signal S1 in response to said instruction signal V2 being queued in said vector instruction stage register, said instruction signal S1 being transferred to said bypass test register in response to an associated clock cycle;
a vector store execution pipe connected to said vector instruction stage register; and
bypass control and sequence logic means and a bypassed instruction hold register each connected to said vector instruction stage register, said bypass control and sequence logic means connected for initiating a bypass sequence and for controlling transfer of said instruction signal V2 from said vector instruction stage register to said bypassed instruction hold register, said instruction signal S1 being released to proceed to said vector instruction stage register and then to said vector store execution pipe in response to said bypass control and sequence logic means transferring said instruction signal V2 from said vector instruction stage register to said bypassed instruction hold register, said instruction signal V2 being returned to said vector instruction stage register for completing said bypass operation by being either of (a) initiating into execution in response to said vector load execution pipe completing said instruction signal V1 and (b) bypassed by another store vector instruction signal S2.

12. The apparatus of claim 9 wherein said bypass control and sequence logic means initiates said bypass sequence in response to (a) said instruction signal V2 being queued in said vector instruction stage register, (b) said instruction signal S1 being queued in said vector processor instruction issue register, (c) no conflict of vector file data usage between instructions of said signals V2, S1, (d) said instruction signal V1 being in the vector load execution pipe, and (e) no instruction signal S1, S2 being in said vector store execution pipe.

* * * * *